(12) United States Patent
Feng et al.

(10) Patent No.: US 10,801,478 B2
(45) Date of Patent: Oct. 13, 2020

(54) OSMOTIC POWER GENERATOR

(71) Applicant: ECOLE POLYTECHNIQUE FEDERALE DE LAUSANNE (EPFL), Lausanne (CH)

(72) Inventors: Jiandong Feng, Hangzhou (CN); Aleksandra Radenovic, Ecublens (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 119 days.

(21) Appl. No.: 16/313,200

(22) PCT Filed: Jun. 27, 2017

(86) PCT No.: PCT/EP2017/065926
§ 371 (c)(1),
(2) Date: Dec. 26, 2018

(87) PCT Pub. No.: WO2018/002099
PCT Pub. Date: Jan. 4, 2018

(65) Prior Publication Data
US 2019/0226463 A1    Jul. 25, 2019

(30) Foreign Application Priority Data
Jun. 28, 2016 (EP) .................... 16176768

(51) Int. Cl.
*F03G 7/00* (2006.01)
*H01M 8/22* (2006.01)
(Continued)

(52) U.S. Cl.
CPC ............. *F03G 7/005* (2013.01); *B01D 61/00* (2013.01); *B01D 61/002* (2013.01); *B01D 61/42* (2013.01);
(Continued)

(58) Field of Classification Search
CPC .......... F03G 7/005; F03G 7/04; B01D 61/00; B01D 61/002; B01D 61/42; B01D 61/422;
(Continued)

(56) References Cited

U.S. PATENT DOCUMENTS 3,906,250 A   9/1975 Loeb
4,171,409 A   10/1979 Loeb
(Continued)

FOREIGN PATENT DOCUMENTS

WO    WO 02/13955     2/2002
WO    WO 2008/060435  5/2008
(Continued)

OTHER PUBLICATIONS

Kim, Dong-Kwon et al. "Power generation from concentration gradient by reverse electrodialysis in ion-selective nanochannels" (Year: 2010).*
(Continued)

*Primary Examiner* — Mark A Laurenzi
*Assistant Examiner* — Xiaoting Hu
(74) *Attorney, Agent, or Firm* — Saliwanchik, Lloyd & Eisenschenk

(57) ABSTRACT

An osmotic power generator comprising an active membrane supported in a housing, at least a first chamber portion disposed on a first side of the active membrane for receiving a first electrolyte liquid and a second chamber portion disposed on a second side of the active membrane for receiving a second electrolyte liquid, a generator circuit comprising at least a first electrode electrically coupled to said first chamber, and at least a second electrode electrically coupled to said second chamber, the first and second electrodes configured to be connected together through a generator load receiving electrical power generated by a difference in potential and an ionic current between the first and
(Continued)

second electrodes. The active membrane includes at least one pore allowing ions to pass between the first and second sides of the membrane under osmosis due to an osmotic gradient between the first and second electrolyte liquids to generate said difference in potential and ionic current between the first and second electrodes.

25 Claims, 16 Drawing Sheets

(51) Int. Cl.
| | |
|---|---|
| *H01M 8/023* | (2016.01) |
| *F03G 7/04* | (2006.01) |
| *B01D 67/00* | (2006.01) |
| *B01D 61/42* | (2006.01) |
| *B01D 71/02* | (2006.01) |
| *B01D 61/00* | (2006.01) |
| *B01D 69/02* | (2006.01) |
| *H01M 8/04007* | (2016.01) |
| *H01M 8/04186* | (2016.01) |
| *B01D 63/08* | (2006.01) |
| *B01D 69/10* | (2006.01) |

(52) U.S. Cl.
CPC ....... *B01D 61/427* (2013.01); *B01D 67/0062* (2013.01); *B01D 67/0072* (2013.01); *B01D 69/02* (2013.01); *B01D 71/02* (2013.01); *B01D 71/022* (2013.01); *F03G 7/04* (2013.01); *H01M 8/023* (2013.01); *H01M 8/04007* (2013.01); *H01M 8/04186* (2013.01); *H01M 8/227* (2013.01); *B01D 63/082* (2013.01); *B01D 69/10* (2013.01); *B01D 2311/2684* (2013.01); *B01D 2313/246* (2013.01); *B01D 2313/345* (2013.01); *B01D 2325/02* (2013.01); *B01D 2325/26* (2013.01)

(58) Field of Classification Search
CPC .... B01D 61/427; B01D 63/08; B01D 63/082; B01D 63/084; B01D 63/087; B01D 63/088; B01D 69/02; B01D 69/06; B01D 69/10; B01D 69/12; B01D 71/02; B01D 71/022; B01D 2311/10; B01D 2311/103; B01D 2311/14; B01D 2311/246; B01D 2311/2684; B01D 2313/246; B01D 2313/345; B01D 2325/02; B01D 2325/04; B01D 2325/26; H01M 8/023; H01M 8/0232; H01M 8/04007; H01M 8/04186; H01M 8/227
See application file for complete search history.

(56) References Cited

U.S. PATENT DOCUMENTS

| | | | | |
|---|---|---|---|---|
| 2003/0015471 | A1 | 1/2003 | Reichwein et al. | |
| 2009/0007555 | A1* | 1/2009 | Jensen | B01D 71/74 60/326 |
| 2010/0183903 | A1* | 7/2010 | McGinnis | C02F 1/16 429/50 |
| 2012/0234758 | A1* | 9/2012 | McGinnis | B01D 71/80 210/652 |
| 2015/0249255 | A1* | 9/2015 | Bocquet | H01M 8/1009 429/479 |
| 2018/0353906 | A1* | 12/2018 | Mottet | F03G 7/005 |
| 2019/0076792 | A1* | 3/2019 | Dryfe | B01D 71/02 |

FOREIGN PATENT DOCUMENTS

| | | |
|---|---|---|
| WO | WO 2009/037515 | 3/2009 |
| WO | WO 2009/151709 | 12/2009 |

OTHER PUBLICATIONS

Wei, Ouyang et al. "Nanofluidic crystal: a facile, high-efficiency and high-power-density scaling up scheme for energy harvesting based on nanofluidic reverse electrodialysis" (Year: 2013).*
Kang, Byeong Dong et al. "Numerical study on energy harvesting from concentration gradient by reverse electrodialysis in anodic alumina nanopores" (Year: 2015).*
Ji, Jinzhao et al. "Osmotic Power Generation with Positively and Negatively Charged 2D Nanofluidic Membrane Pairs" (Year: 2016).*
Lee, Sang Woo et al. "Power Generation from Concentration Gradient by Reverse Electrodialysis in Dense Silica Membranes for Microfluidic and Nanofluidic Systems" (Year: 2016).*
Cao, L. et al. "Towards understanding the nanofluidic reverse electrodialysis system: well matched charge selectivity and ionic composition" *Energy & Environmental Science*, 2011, pp. 2259-2266, vol. 4.
Crosthwaite, J. M. et al. "Phase transition and decomposition temperatures, heat capacities and viscosities of pyridinium ionic liquids" *J. Chem. Thermodynamics*, 2005, pp. 559-568, vol. 37.
Dumcenco, D. et al. "Large-Area Epitaxial Monolayer $MoS_2$," *ACS Nano*, 2015, pp. 4611-4620, vol. 9, No. 4.
Farimani, A. B. et al. "DNA Base Detection Using a Single-Layer $MoS_2$," *ACS Nano*, 2014, pp. 7914-7922, vol. 8, No. 8.
Feng, J. et al. "Electrochemical Reaction in Single Layer $MoS_2$: Nanopores Opened Atom by Atom" *Nano Letters*, Apr. 30, 2015, pp. 3431-3438, vol. 15.
Ge, P. et al. "Hydrogen evolution across nano-Schottky junctions at carbon supported $MoS_2$ catalysts in biphasic liquid systems" *Chem. Commun.* 2012, pp. 6484-6486, vol. 48.
Grazianetti, C. et al. "Two-dimensional silicon: the advent of silicene" *2D Materials*, 2016, pp. 1-24, vol. 3.
Houssa, M. et al. "Defect generation in high κ gate dielectric stacks under electrical stress: the impact of hydrogen" *Journal of Physics: Condensed Matter*, 2005, pp. S2075-S2088, vol. 17.
Liu, K.-K. et al. "Growth of Large-Area and Highly Crystalline $MoS_2$ Thin Layers on Insulating Substrates" *Nano Letters*, Feb. 27, 2012, pp. 1538-1544, vol. 12.
Liu, K. et al. "Atomically Thin Molybdenum Disulfide Nanopores with High Sensitivity for DNA Translocation" *ACS Nano*, 2014, pp. 2504-2511, vol. 8, No. 3.
Liu, N. et al. "Large-Area Atomically Thin $MoS_2$ Nanosheets Prepared Using Electrochemical Exfoliation" *ACS Nano*, 2014, pp. 6902-6910, vol. 8, No. 7.
Loeb, S. et al. "Osmotic Power Plants" *Science*, Aug. 22, 1975, pp. 654-655, vol. 189. No. 4203.
Logan, B. E. et al. "Membrane-based processes for sustainable power generation using water" *Nature*, Aug. 16, 2012, pp. 313-319, vol. 488.
Matsumoto, M. et al. "Ultrahigh-throughput exfoliation of graphite into pristine 'single-layer' graphene using microwaves and molecularly engineered ionic liquids" *Nature Chemistry*, Aug. 10, 2015, pp. 730-736, vol. 7.
Molle, A. et al. "Buckled two-dimensional Xene sheets" *Nature Materials*, Jan. 16, 2017, pp. 163-169, vol. 16.
Nicolosi, V. et al. "Liquid Exfoliation of Layered Materials" *Science*, Jun. 21, 2013, pp. 1-19, vol. 340.
Novoselov, K. S. et al. "Electric Field Effect in Atomically Thin Carbon Films" *Science*, Oct. 22, 2004, pp. 666-669, vol. 306.
Novoselov, K. S. et al. "Two-dimensional atomic crystals" *PNAS*, Jul. 26, 2005, pp. 10451-10453, vol. 102, No. 30.
Pattle, R. E. "Production of Electric Power by mixing Fresh and Salt Water in the Hydro-electric Pile" *Nature*, Oct. 2, 1954, p. 660, vol. 174.
Plimpton, S. "Fast Parallel Algorithms for Short-Range Molecular Dynamics" *Journal of Computational Physics*, 1995, pp. 1-19, vol. 117.
Shan, Y. P. et al. "Surface modification of graphene nanopores for protein translocation" *Nanotechnology*, 2013, pp. 1-9, vol. 24.
Siria, A. et al. "Giant osmotic energy conversion measured in a single transmembrane boron nitride nanotube" *Nature*, Feb. 28, 2013, pp. 455-458, vol. 494.

(56) References Cited

OTHER PUBLICATIONS

Surwade, S. P. et al. "Water desalination using nanoporous single-layer graphene" *Nature Nanotechnology*, Mar. 23, 2015, pp. 459-464, vol. 10.
Van Der Heyden, F. H. J. et al. "Charge Inversion at High Ionic Strength Studied by Streaming Currents" *Physical Review Letters*, 2006, pp. 224502-1-224502-4, vol. 96.
Vlassiouk, I, et al. "Ionic Selectivity of Single Nanochannels" *Nano Letters*, 2008, pp. 1978-1985, vol. 8, No. 7.
Written Opinion in International Application No. PCT/EP2017/065926, dated Aug. 11, 2017, pp. 1-6.

* cited by examiner d

| $C_{min}/C_{max}$ | $V_{measured}$, mV | $E_{redox}$, mV | $V_{osr}$, mV | Ion selectivity |
|---|---|---|---|---|
| 1mM/10mM | 100.6 | 46.9 | 53.7 | 0.92 |
| 10mM/100mM | 104.4 | 53.5 | 50.9 | 0.86 |
| 10mM/1M | 153.3 | 107.2 | 46.1 | 0.78 |
| 1mM/100mM | 183.0 | 100.4 | 82.6 | 0.7 |
| 100mM/1M | 67.3 | 53.7 | 13.6 | 0.23 |

Figure 4 (continued)

Table 1

| Reverse electrodialysis cells | Power density (W/m²) | Membrane thickness |
|---|---|---|
| Weinstrin and Leitz, 1976 | 0.17 | 1 mm |
| Audinos, 1983 | 0.40 | 3 mm |
| Turek and Bandura, 2007 | 0.46 | 0.19 mm |
| Suda et al, 2007 | 0.26 | 1 mm |
| Veerman et al, 2009 | 0.95 | 0.2 mm |
| Kim et al, 2010 | 7.7 | 0.14 mm |
| Siria et al, 2013 | 4000 | 1 um |
| This work | $10^6$ | 0.65 nm |
| Multilayer MoS₂ (Simulations) | 30000 | 7.2 nm |

*Weinstein et al., 1976, Science 191, 557-559*
*Audinos, 1983, Journal of Power Sources 10, 203-217*
*Turek et al., 2007, Desalination 205, 67-74*
*Suda et al., 2007, Energy 32, 165-173*
*Veerman et al., 2009, Journal of Membrane Science 343, 7-15*
*Kim et al., 2010, supra*
*Siria et al., 2013, supra*

Figure 9

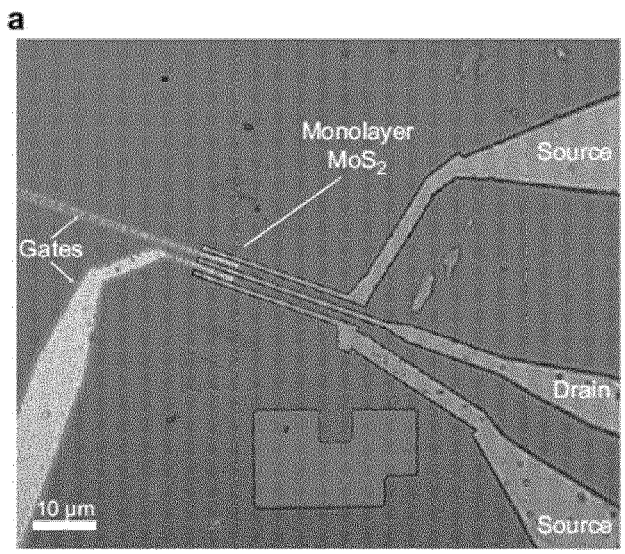

Figure 10

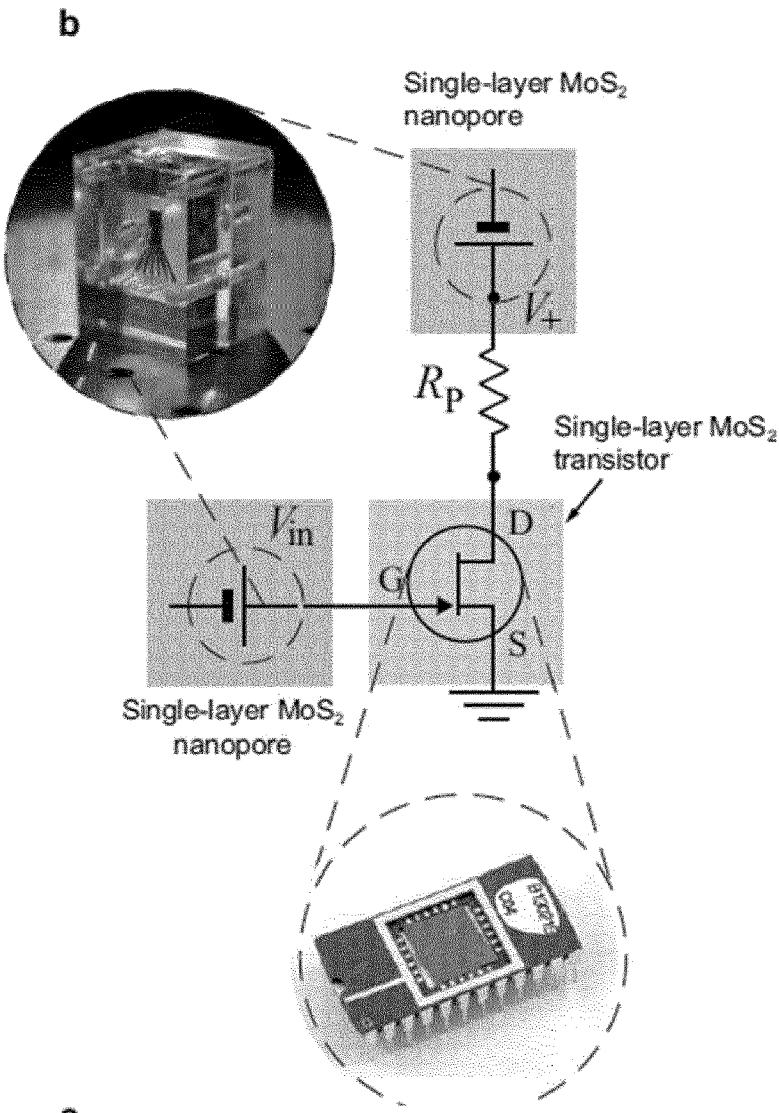
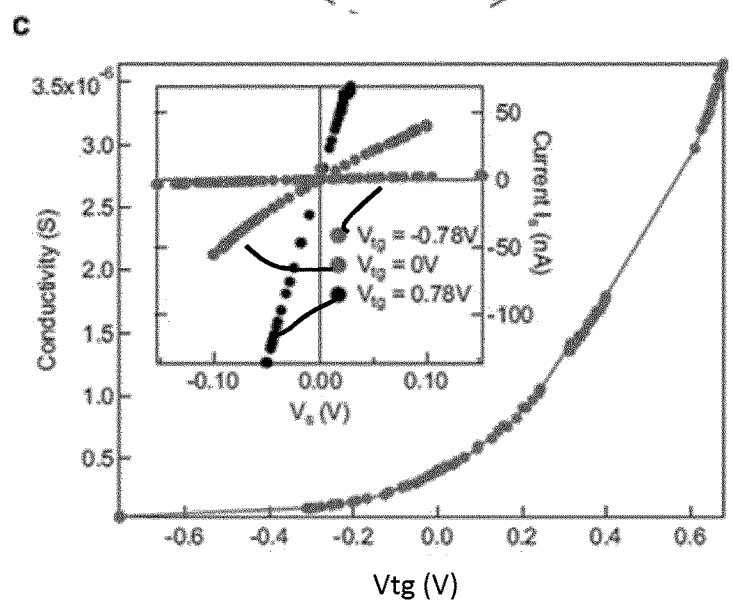
Figure 10 (continued)

Figure 12b
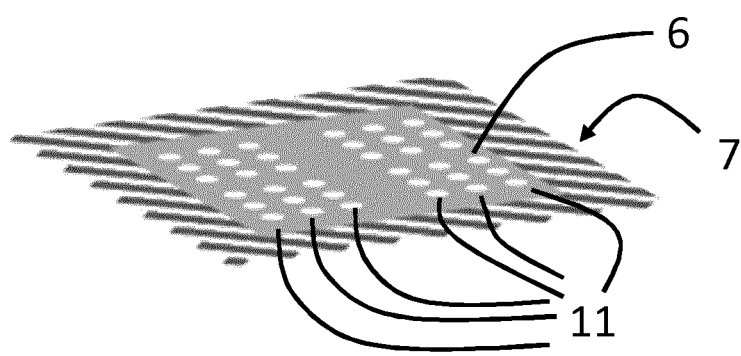
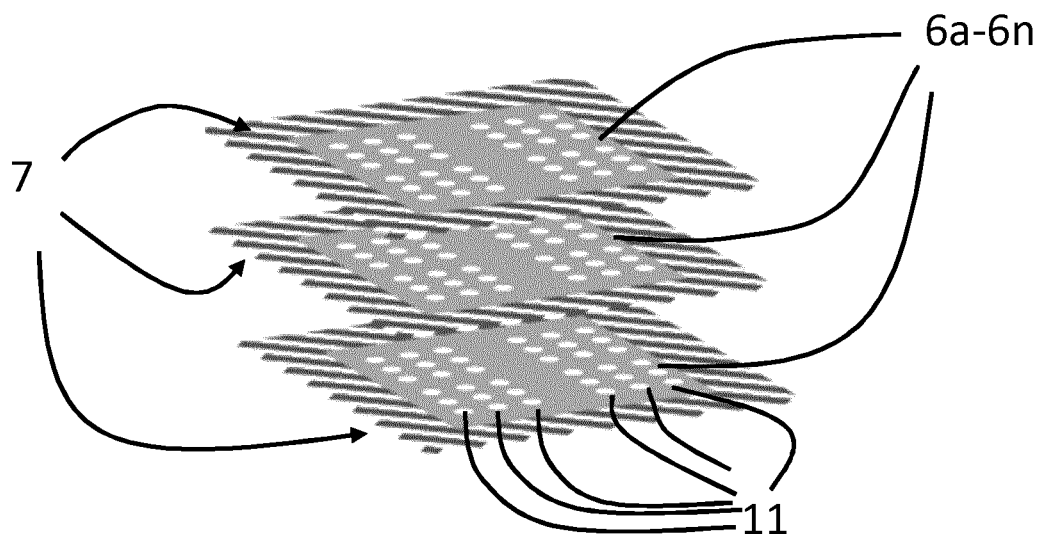

OSMOTIC POWER GENERATOR

CROSS-REFERENCE TO RELATED APPLICATION

This application is the U.S. national stage application of International Patent Application No. PCT/EP2017/065926, filed Jun. 27, 2017.

FIELD OF THE INVENTION

The present invention pertains generally to the field of membrane based processes for power generation with water, in particular for use in the field of osmotic power generation.

BACKGROUND OF THE INVENTION

Power generation from the osmotic pressure difference between fresh water and seawater is an attractive, renewable and clean energy harvesting method and was investigated a long time ago and is still under development (Pattle, 1975, Nature 174, 660; Loeb, 1975, Science 189, 654-655; Logan et al., 2012, Nature, 488, 313-319). Prospective osmotic power generation plants have been built using the osmotic effect where sea water is pumped from the surface of the sea to a barrier of semi-permeable membranes, generally made of an organic membrane. By osmosis, fresh water is driven through the membranes, trying to even out the amount of dissolved salt in the sea water and the flushing solution is then pressurized (e.g. at about 9-10 bars) and pumped out (U.S. Pat. No. 3,906,250). When the water is pressed out through the membranes by sucking effect, a steam appears which is used to move a turbine. Therefore, even if the osmosis effect is used in such plants, this is more the sucking effect on the flow which generates the electric power, also known as known as pressure-retarded-osmosis (PRO). The performance which was achieved so far in such plants depends on the nature of the membrane used and ranges from about 2.6 W/m² to about 5 W/m² but has not exceeded about 20 W/m².

Some attempts of producing current through the triggering of an electrokinetic phenomenon known as "streaming potential" when an electrolyte is driven through single nanofluidic channels either by a pressure gradient (van der Heyden et al., 2005, Phys. Rev. Lett., 95, 116104), or an osmotic potential from a salt concentration gradient through an alternating cation and anion exchange membranes (e.g. by reverse electrodialysis as described in U.S. Pat. No. 4,171,409). The performance of this process lies on the configuration and materials used for the membrane and recently membranes using single transmembrane boron nitride nanotube (Siria et al., 2013, Nature, 494, 455-458) was carried out. However, the manufacture process for obtaining those nanotubes is extremely tedious, expensive and very difficult to scale up. Therefore, there is a need for improving performance of power generators using renewable and clean source of energy or for finding new generation of those, especially for use in ultra-low power devices and future electronics.

SUMMARY OF THE INVENTION

An object of this invention is to provide a power generator that enables highly efficient conversion of energy from renewable source.

It is advantageous to provide an osmotic power generator where the membrane can be easily manufactured in a scalable manner.

It is advantageous to provide an osmotic power generator where the streaming potential created when the electrolyte membrane is driven through the pores is well controlled through a fully controllable pore size distribution.

It is advantageous to provide a power generator that is economical to implement for mass production and easy to use.

It is advantageous to provide a power generator that is able to generate a high power density of several to tens of $kWm^{-2}$.

It is advantageous to provide a power generator that can be used in nanoscale devices.

Objects of this invention have been achieved by providing a power generator according to claim 1 or 2 and a method for generating osmotic power according to claim 23.

Disclosed herein, according to a first aspect of the invention, is an osmotic power generator comprising a housing, an active membrane mounted in the housing, at least a first chamber disposed on a first side of the active membrane for receiving a first electrolyte liquid and a second chamber disposed on a second side of the active membrane for receiving a second electrolyte liquid, a generator circuit comprising at least a first electrode electrically coupled to said first chamber, and at least a second electrode electrically coupled to said second chamber, the first and second electrodes configured to be connected together through a generator load receiving electrical power generated by a difference in potential and an ionic current between the first and second electrodes, the active membrane including at least one pore allowing ions to pass between the first and second sides of the membrane under osmosis due to an osmotic gradient between the first and second electrolyte liquids to generate said difference in potential and ionic current between the first and second electrodes, wherein the active membrane comprises or consists of a thin layer of 2D material having a thickness (Hm) from about 0.3 nm to 5 nm, and the at least one pore has an average diameter (Dp) from about 2 nm to about 25 nm.

Disclosed herein, according to a another aspect of the invention, an osmotic power generator comprising a housing, two or more active membranes separated by chambers in a stacked arrangement mounted in the housing, at least a first chamber disposed on a first side of the stacked arrangement for receiving a first electrolyte liquid and a second chamber disposed on a second side of the stacked arrangement for receiving a second electrolyte liquid, a generator circuit comprising at least a first electrode electrically coupled to said first chamber, and at least a second electrode electrically coupled to said second chamber, the first and second electrodes configured to be connected together through a generator load receiving electrical power generated by a difference in potential and an ionic current between the first and second electrodes, each of the two or more active membranes including at least one pore allowing ions to pass between the first and second sides of the stacked arrangement under osmosis due to an osmotic gradient between the first and second electrolyte liquids to generate said difference in potential and ionic current between the first and second electrodes, wherein each active membrane comprises or consists of a thin layer of 2D material having a thickness (Hm) from about 0.3 nm to 5 nm, and the at least one pore has an average diameter (Dp) from about 2 nm to about 25 nm.

According to a particular embodiment, the said active membrane is made of an electrochemically etchable 2D material including any one or combination of transition metal dichalcogenide (TMDC) crystals, graphene, hBN, silicene, transition metal trichalcogenides, metal halides, transition metal oxides such as described in Nicolosi et al., 213, *Science* 340, 1226419.

According to another particular embodiment, the said active membrane is made of an electrochemically etchable 2D material including any one or combination of monoelemental class of two-dimensional (2D) crystals termed 2D-Xenes such as silicene, germanene and stanene (X =Si, Ge, Sn, Pb et . . . ) which, together with their ligand-functionalized derivatives as referred to as Xanes as described in Molle et al., 2017, *Nature Materials*, 16, 163-169 which comprise group IVA atoms arranged in a honeycomb lattice similar to graphene but with varying degrees of buckling.

According to a more particular embodiment, the said active membrane is made of or comprises a transition metal dichalcogenide (TMDC) of chemical formula $MX_2$, where M is a transition metal atom and X is a chalcogen (S, Se, or Te).

According to a further more particular embodiment, the M is a transition metal atom selected from Ta, Nb, Mo, W, Ti and Re.

According to another further more particular embodiment, the TMDC is selected from $MoS_2$, $SnSe_2$, $WS_2$, $TaS_2$, $MoSe_2$, $WSe_2$, $TaSe_2$, $NbS_2$, $NbSe_2$, $TiS_2$, $TiSe_2$, $ReS_2$ and $ReSe_2$.

According to another further more particular embodiment, the active membrane thin layer comprises $MoS_2$ thin layers or is a $MoS_2$ monolayer.

According to another particular embodiment, the active membrane thin layer thickness is achieved via liquid exfoliation (e.g. in molten $LiNO_3$).

According to another particular embodiment, the TMDC layer is a membrane grown by either by metalorganic chemical vapour deposition (MOCVD) or by chemical vapour deposition (CVD).

According to another particular embodiment, the active membrane thin layer is in a single, double or multilayer form.

According to another particular embodiment, the TMDC layer comprises CVD grown thin layers or is a CVD grown monolayer.

According to a more particular embodiment, the active membrane comprises a plurality of pores.

According to a further more particular embodiment, the active membrane thin layer is supported by a support structure provided on at least one side of the thin layer, the support structure comprising a plurality of pillar portions spaced apart between suspended portions of the thin layer comprising a plurality of said pores.

According to a particular embodiment, the material of the support structure comprises SiNx, glass, $Al_2O_3$, $HfO_2$, quartz, or $TiO_2$.

According to another particular embodiment, the material of the support structure comprises glass, a thin polymer membrane (such as made of Metal-organic frameworks (MOFs)).

According to another particular embodiment, the electrolyte liquid is an aqueous ionic solution (e.g. water and KCl or any inorganic salts such as LiCl, NaCl, $MgCl_2$, $CaCl_2$ etc) or a room temperature ionic liquid (RTILs).

According to an embodiment, the active membrane may be charged by varying the pH of the ionic solution.

According to a particular embodiment, the osmotic power generator according to the invention further comprises a pressure source or pressure generator configured to increase the pressure of the first electrolyte liquid in the first chamber.

According to a further particular embodiment, the pressure source is by the action of gravity on a column of liquid on said first side of the active membrane.

According to another further particular embodiment, the osmotic power generator according to any preceding claim further comprises a temperature regulation system, for instance comprising a temperature sensing element, and a heat source, for instance a waste heat source or a renewable energy heat source such as a solar power source, to heat the first electrolyte liquid.

According to another further particular embodiment, the osmotic power generator according to the invention further includes an energy storage device constituting in whole or in part the generator load.

Disclosed herein, according to another aspect of the invention, is a method of generating osmotic power in an osmotic membrane chamber, said method comprising:
  providing an osmotic power generator according to the invention,
  supplying a first electrolyte liquid on said first side of the active membrane,
  supplying a second electrolyte liquid on the second side of the active membrane, whereby the first electrolyte liquid has greater ionic strength than the second electrolyte liquid, and
  connecting the first and second electrodes to a generator load.

According to a particular aspect, the first electrolyte liquid is seawater and the second electrolyte liquid is fresh water.

The above mentioned features may be combined in any appropriate manner.

An advantageous characteristic of the invention is to provide an osmotic power generator and a method for generating osmotic power having high energy conversion efficiency.

An advantageous characteristic of the invention is to provide a power generator using renewable sources of energy and cost effective to produce.

Embodiments may include an electrical apparatus comprising a power generator according to the invention.

Other features and advantages of the invention will be apparent from the claims, detailed description, and figures.

BRIEF DESCRIPTION OF THE DRAWINGS

FIG. 9 represents power density vs membrane thickness compared to different membrane systems of the art (Table 1).

FIG. 10 represents a prototype of a self-powered nanosystem using a osmotic power generator of the invention; a: Optical image of a fabricated MoS$_2$ transistor with a designed gate, drain and source electrodes; b: Circuit diagram of the self-powered nanosystem where the drain-source supply for MoS$_2$ transistor is provided by a MoS$_2$ nanopore while a second nanopore device operates as the gate voltage source. Rp, pore resistance. Vin, gate voltage, V+, drain-source voltage. G, gate; S, source; D, drain; c: Powering all the terminals of the transistor with nanopore generators. Vtg, top gate voltage.

DETAILED DESCRIPTION OF THE INVENTION

Certain osmotic power generators have certain disadvantages, in particular the low energy conversion efficiency. Increased efficiency systems have been found through the generation of streaming potential resulting from ion fluxes in a nanotube but this system would not be scalable nor economically viable.

An osmotic power generator of the invention has the advantage of combining high osmotic energy conversion, easiness to manufacture in a cost-effective and fully controllable manner. An osmotic power generator of the invention is described herein.

Figure 1A:
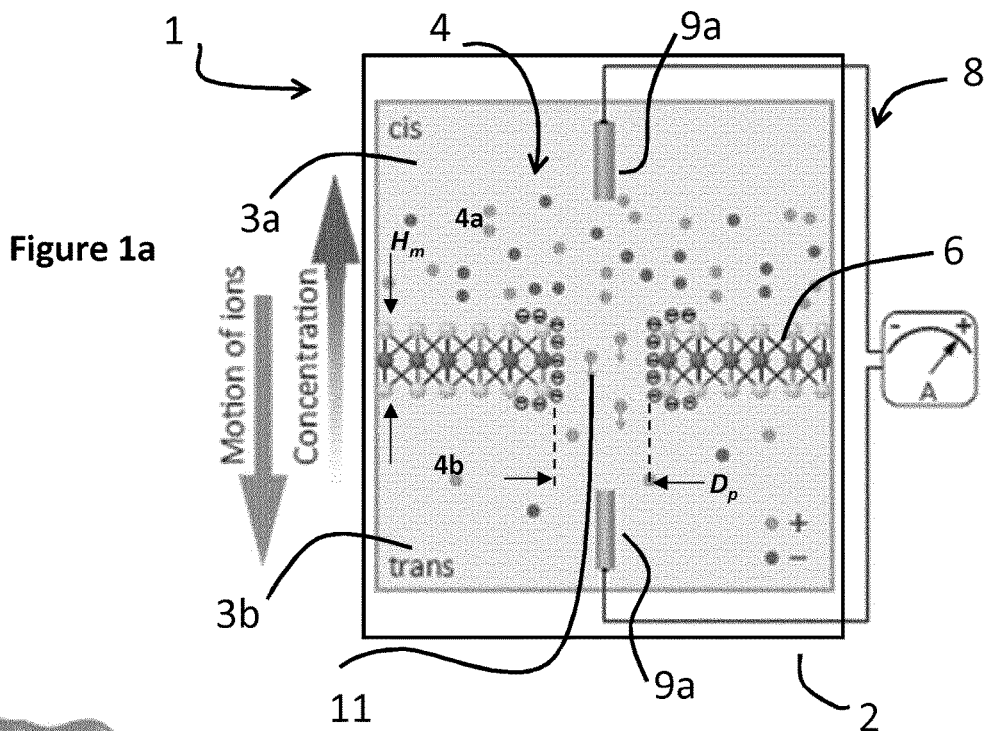
FIG. 1 is a schematic representation of osmotic energy harvesting with 2D material nanopores ($MoS_2$) in a power generator of the invention; a: Solutions with different concentrations are separated by a 0.65 nm thick 2D material nanopore membrane. An ion flux driven by chemical potential (voltage, concentration, liquid-liquid junction, pH, pressure) through the pore is screened by the negatively charged pore of the 2D material, forming a diffusion current composed of mostly positively charged ions; b: Molecular dynamics simulation box used for simulating the osmotic ion flux; c: Molecular dynamics simulated potassium and chloride concentrations as a function of the radial distance from the center of the pore. The region near the charged wall of the pore is representative of the ionic double layer. Cmax: maximum concentration. Cmin: minimum concentration; d: Example of a TEM-drilled 5 nm $MoS_2$ nanopore.
Figure 12A:
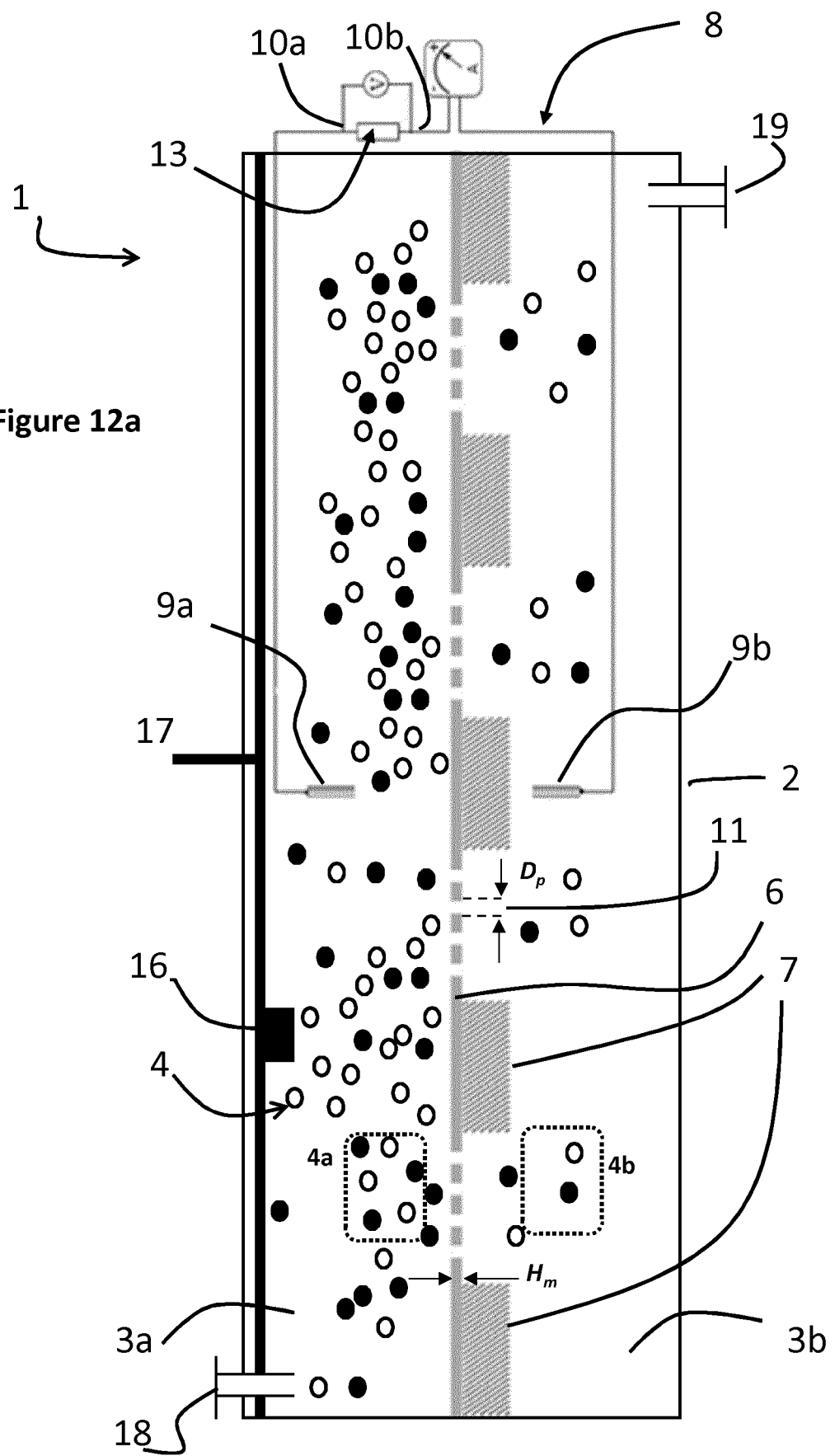
FIG. 12 is a schematic representation of an osmotic power generator of the invention; a: Osmotic power generator comprising an active membrane with a plurality of nanopores with a pore diameter Dp; b: Example of a 2D material membrane with nanopores with a pore diameter Dp (top) which can be amounted in parallel (bottom); c: Osmotic power generator comprising several active membranes amounted in parallel as the one described in b.

Referring to the figures, in particular first to FIGS. 1a and 12a, an osmotic power generator 1 comprises
  a housing 2,
  an active membrane 6 mounted in the housing,
  at least a first chamber 3a (cis chamber) disposed on a first side of the active membrane 6 for receiving a first electrolyte liquid 4a and a second chamber 3b ((trans chamber portion) disposed on a second side of the active membrane 6 for receiving a second electrolyte liquid 4b,
  a generator circuit 8 comprising at least a first electrode 9a electrically coupled to said first chamber 3a, and at least a second electrode 9b electrically coupled to said second chamber 3b, the first and second electrodes configured to be connected together through a generator load receiving electrical power generated by a difference in potential and an ionic current between the first and second electrodes, the active membrane 6 including at least one pore 11 allowing ions to pass between the first and second sides of the membrane 6 under osmosis due to an osmotic gradient between the first and second electrolyte liquids 4a,4b to generate said difference in potential and ionic current between the first and second electrodes 9a, 9b, wherein the active membrane 6 comprises or consists of a thin layer of 2D material having a thickness (Hm) from about 0.3 nm to 5 nm, and the at least one pore has an average diameter (Dp) from about 2 nm to about 25 nm.

Figure 12C:
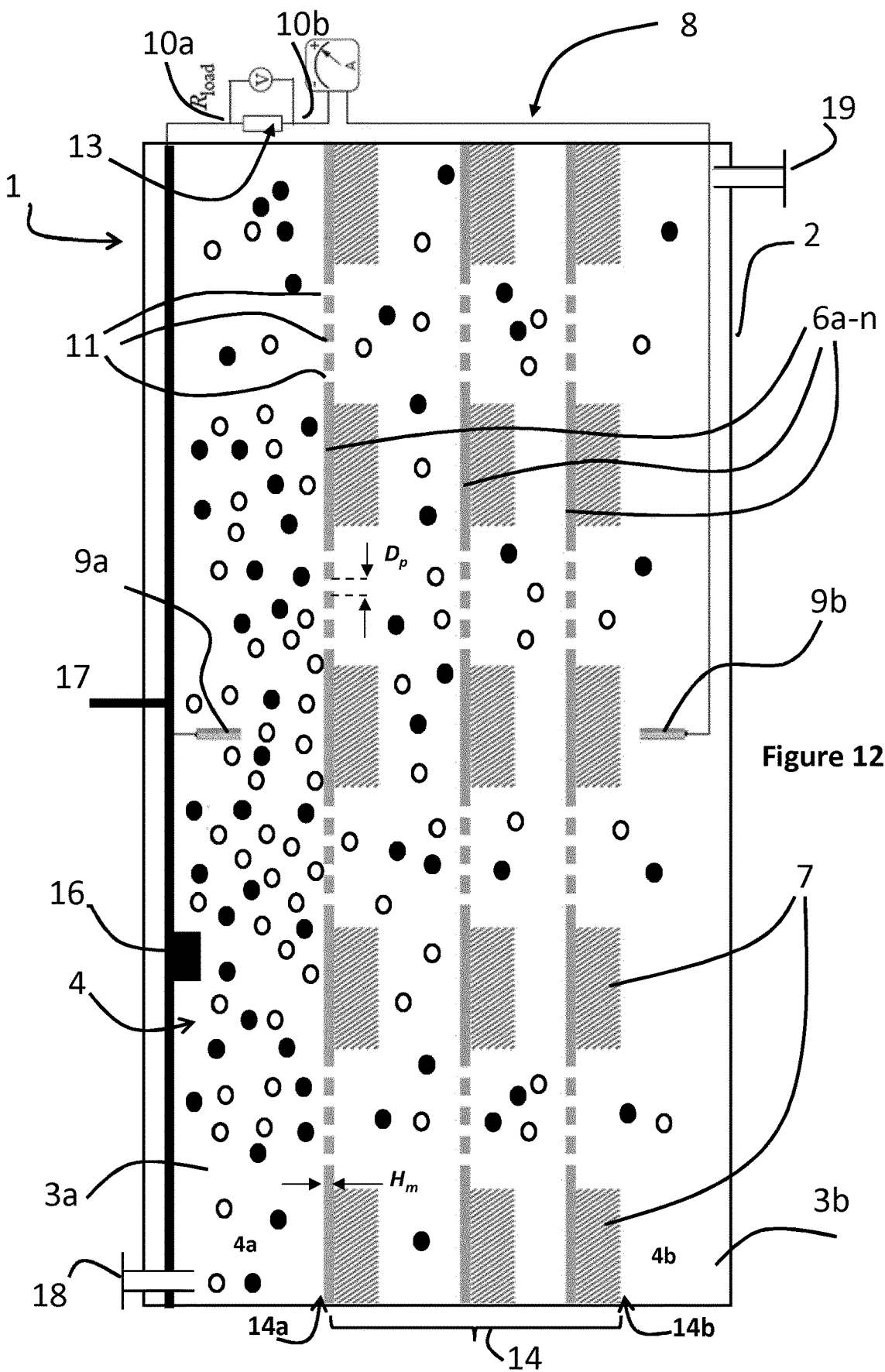

Referring to the figures, in particular to FIG. 12c, an osmotic power generator 1 comprises a housing 1, two or more active membranes 6a-6n separated by chambers in a stacked arrangement 14 mounted in the housing, at least a first chamber 3a disposed on a first side of the stacked arrangement 14a for receiving a first electrolyte liquid 4a and a second chamber 3b disposed on a second side of the stacked arrangement 14b for receiving a second electrolyte liquid 4b, a generator circuit 8 comprising at least a first electrode 9a electrically coupled to said first chamber 3a, and at least a second electrode 9b electrically coupled to said second chamber 3b, the first and second electrodes configured to be connected together through a generator load 13 receiving electrical power generated by a difference in potential and an ionic current between the first and second electrodes, each of the two or more active membranes 6a-6n including at least one pore 11 allowing ions to pass between the first and second sides of the stacked arrangement 14a, 14b under osmosis due to an osmotic gradient between the first and second electrolyte liquids 4a, 4b to generate said difference in potential and ionic current between the first and second electrodes 9a, 9b, wherein each active membrane comprises or consists of a thin layer of 2D material having a thickness (Hm) from about 0.3 nm to 5 nm, and the at least one pore has an average diameter (Dp) from about 2 nm to about 25 nm.

In another further embodiment of the invention, the active membrane is of a 2D material as described in Nicolosi et al., 2013, *Science*, 340 (6139), DOI: 10.1126.

Thin layers of 2D materials with good quality suitable for use in an osmotic pressure generator according to the invention can be prepared by both exfoliation and chemical vapor deposition (CVD) (Novoselov et al., *PNAS*, 2005, 102, 10541-1053; Liu et al. 2012, Nano Lett., 12, 1538-1544).

Xenes can be grown as a single layer epitaxially grown on a substrate as described in Houssa, et al., 2015, *Journal of Physics-Condensed Matter*, 27, 253002; Grazianetti et al., 2016, *2D Materials*, 3, 012001 or by mechanical exfoliation (Novoselov et al., 2004, *Science*, 306 (5696), 666-669) or by microwaves and molecularly engineered ionic liquids assisted exfoliation (Matsumoto et al., 2015, *Nature Chemistry*, 7, 730-736) or by electrochemical exfoliation (Liu et al., 2014, *ACS Nano*, 8 (7), 6902-6910).

Typically, the thickness of 2D material active membranes according to the invention can be assessed by Raman/optical electron microscopy, photo-luminescence (PL) measurements and Atomic Force Microscopy (AFM).

According to a particular aspect, the thickness of an active membrane according to the invention may be less than 2 nm, typically from about 0.7 nm to less than 2 nm. In particular, the active membrane is from about 0.7 nm (e.g. one layer) to about 4.5 nm thick (e.g. seven layers), for example from about 0.7 nm to about 1.5 nm thick (e.g. two layers).

According to a further particular aspect, the active membrane thin layer is a monolayer.

According to another aspect, the osmotic power generator comprises a plurality of active membranes 6 (e.g. 6a-6n), in particular disposed in a stacked arrangement 14 sur as illustrated on FIG. 12c. Typically an osmotic power generator according to the invention comprises from about 2 to about 100 active membranes disposed in parallel.

According to one aspect, the active membrane 6 is configured such that the portion of said active membrane 6 comprising the said at least one pore 11 is suspended at the interface of said electrically conducting liquids 4a and 4b and other portion(s) of the active membrane is (are) supported by a support structure 7.

The support structure comprises a plurality of pillar portions either held together to form a continuous structure or disjointed.

According to another aspect, the support structure has a thickness from about 1 to about 3 layers (e.g. below 5 nm).

The active membrane 6 thin layer can be in the form of a continuous sheet of 2D material or multiple sheets of 2D material assembled or juxtaposed in a plane.

According to one aspect, the said active membrane 6 comprises a plurality of pores 11, typically with a pore density up to about 50%, such that a total pore surface area of the plurality of pores of the active membrane constitutes up to about 50% of a surface area of the active membrane.

According to one aspect, the said active membrane 6 comprises a plurality of pores 11, with a pore density up to about 90% of a surface area of the active membrane.

According to another aspect, pores in the active membrane can be formed by a process as described in PCT/IB2016/051425 and are nanometer sized, typically from about 2 nm to 20 nm diameter (for example typically from about 1 nm to about 5 nm, for example less than 4 nm or less such as about 3 nm) and from about 0.3 nm to 5 nm thickness (for example about 0.7 nm). Typically, the size of the pores can be measured by Transmission electron microscopy (TEM) and calculated from the current-voltage characteristics.

According to the invention, the term "housing" should be understood in a broad sense and may encompass a non-closed volume exposed to the external environment.

According to one aspect, the generator circuit 8 comprises electrical terminals 10a, 10b related to a connection interface for a generator load 13, for example for electric appliances or electrical storage systems.

According to one aspect, the generator circuit 8 comprises electrodes in Ag/AgCl or Pt.

According to a further more particular embodiment, an electrolyte of said first electrolyte liquid is potassium chloride (KCl).

According to another further more particular embodiment, an electrolyte of said first electrolyte liquid is natrium chloride (NaCl).

According to another particular embodiment, the first electrolyte liquid is seawater.

According to another particular embodiment, the first electrolyte liquid is a RTIL.

In an embodiment of the invention, the room temperature ionic liquid (RTIL) is selected from a group based on the anion nature: (a) systems based on $AlCl_3$ and organic salts such as 1-butyl-3-methylimidazolium chloride, [bmim][Cl]; (b) systems based on anions like $[PF_6]^-$, $[BF_4]^-$ and $[SbF_6]^-$; (c) systems based on anions such as $[CF_3SO_3]^-$, $[(CF_3SO_2)_2N]^-$, $[Tf_2N]^-$ and similar; (d) systems based on anions such as alkylsulfates and alkylsulfonates; (e) carboranes ($[CB_{11}H_{12}]^-$, $[CB_{11}H_6Cl_6]^-$, $[CB_{11}H_6Br_6]^-$) and orthoborates.

In an embodiment of the invention, the room temperature ionic liquid (RTIL) comprises hexafluorophosphate anions.

In an embodiment of the invention, the room temperature ionic liquid (RTIL) includes N,N-dialkylimidazolium cations such as dibutyl, dioctyl, dinonyl, didecylimidazolium, 1-Butyl-3-methyl and 1-ethyl-3-methylimidazolium cations ([bmim]+ and [emim]+).

In another embodiment of the invention, the room temperature ionic liquid (RTIL) includes pyridinium cations such as 1-butyl pyridinium (bpy)$^+$ cations and the like such as described in Crosthwaite et al., 2005, *The Journal of Chemical Thermodynamics*, 37(6): 559-568.

In an embodiment of the invention, the room temperature ionic liquid (RTIL) comprises 1-Butyl-3-methyl and 1-ethyl-3-methyl imidazolium cations.

In an embodiment of the invention, the room temperature ionic liquid (RTIL) comprises 1-butyl pyridinium (bpy)$^+$ cation.

In an embodiment of the invention, the room temperature ionic liquid (RTIL) is preferably 1-butyl-3-methylimidazolinom hexafluorophosphate ($BminPF_6$).

According to a further aspect, the volume of the housing is from about 100 µL to about 1,000 L.

According to another particular aspect, the concentration of the electrolyte in the first electrolyte liquid varies from 4 M to 0.4 M.

According to a more particular aspect, the osmotic power generator further comprises temperature regulation system 16 for heating the first electrically liquid.

Typically, the temperature regulation system is maintaining the temperature of the first electrolyte liquid at about 4 to about 50° C.

According to another particular aspect, the osmotic power generator further comprises pressure source or pressure generator 17 to increase the pressure of the first electrolyte liquid to about 100 bars.

According to another particular aspect, the osmotic power generator further comprises an inlet 18 provided in the first chamber 3a and configured to allow filling the electrolyte within said chamber, in particular for refilling the first electrolyte liquid when the electrolyte concentration has been even out between the two chambers or for cleaning purposes.

According to another particular aspect, the osmotic power generator further comprises an outlet 19 provided in the second chamber portion 3b allowing the flowing of the electrolyte liquid from the second chamber 3b.

The osmotic power generator according to the invention is configured to generate electricity.

Such energy can be either directly used by an electrical appliance when connected to the osmotic current conducting member or stored in a battery connected to the power generator and configured to store electrical power generated by the power generator.

An osmotic power generator according to the invention may find applications in electrical appliance, for example self-powered devices in future electronics and serve as a nanopower source of energy due to its high efficiency and power density.

The invention having been described, the following examples are presented by way of illustration, and not limitation.

LIST OF ELEMENTS REFERENCED (FIGS. 1 AND 12)

---

1 Osmotic power generator
  2 housing
    3 chambers
      3a first chamber (cis chamber)
        4a first electrolyte liquid
        16 temperature regulation system
          temperature sensing element
          heat source
        17 pressure source or pressure generator
        18 inlet
      3b second chamber (trans chamber)
        4b second electrolyte liquid
        19 outlet
    6 active membrane or 14 two or more active membranes 6 in as stacked arrangement
      Hm active layer thickness
      11 pore(s) (nano)
        Dp pore diameter
        Hp pore thickness
    7 support structure
      Hs support layer thickness
  8 generator circuit
    9a first electrode
    9b second electrode
    10 electrical terminals (10a, 10b)
      Connection interface to electric appliance 13

---

EXAMPLES

Example 1

Osmotic Power Generator with a Material 2D Membrane

An osmotic power generator according to the invention was designed which comprises: a generator housing 2 having two chambers 3a and 3b, each of them comprising a reservoir containing an electrolyte liquid (e.g. potassium chloride (KCl) solution) 4 with an initial electrolyte concentration difference between the two chambers and having a 2D material membrane 6 (e.g. $MoS_2$ 0.65 nm thick single layer) into which a single nanopore 11 with a diameter in the 2-25 nm range has been introduced either by TEM (Liu et al., 2014, *ACS Nano* 8, 2504-2511) (FIG. 1c) or by the recently demonstrated electrochemical reaction (ECR) technique (Feng et al., 2015, *Nano Lett.* 15, 3431).

Figure 1B:
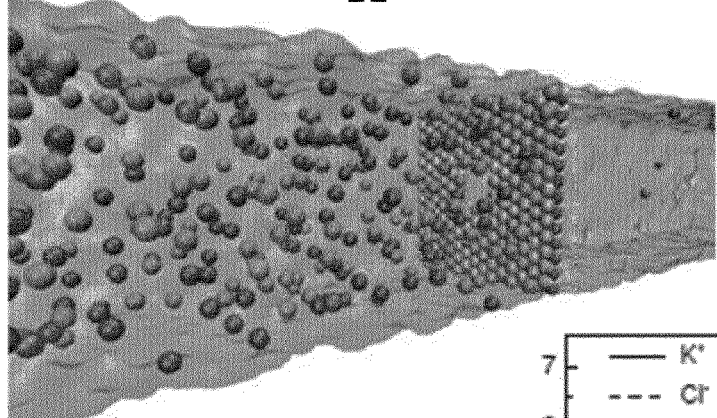
Figure 1C:
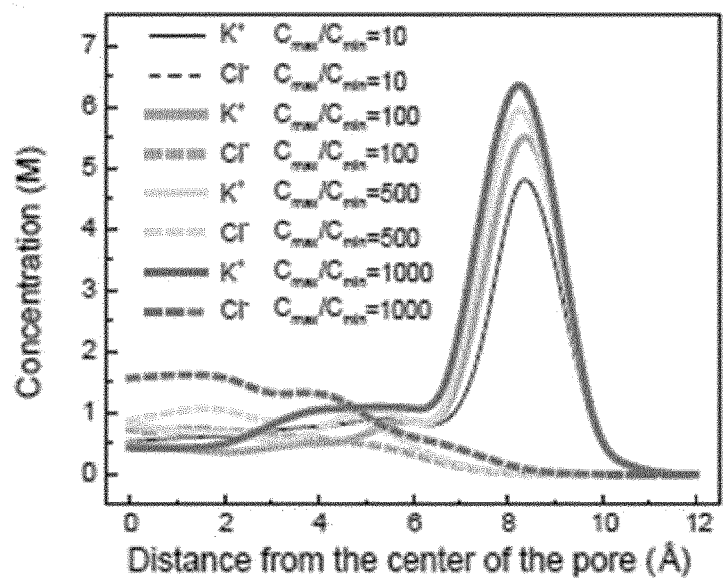

The osmotic pressure difference arising from the electrolyte concentration difference in the electrolyte liquids (4a, 4b) between the two chambers drives ions spontaneously across the nanopore 11, forming an osmotic ion flux towards equilibrium state, as shown in FIG. 1a. The presence of surface charges on the pore screens the passing ions by their charge polarity and thus results in a net measurable osmotic current, known as reverse electrodialysis (Logan et al., 2012, supra). This cation selectivity can be better understood by analyzing the concentration of each ion type (potassium and chloride) as a function of the radial distance from the center of the pore, as shown in the simulation results from molecular dynamics (FIG. 1b). A stable osmotic current can be expected due to the long time required for the system to reach its equilibrium state. The osmotic current and voltage across the pore were measured by using a pair of Ag/AgCl electrodes (9a, 9b) to characterize the current-voltage (I-V) response of the nanopore.

Figure 2:
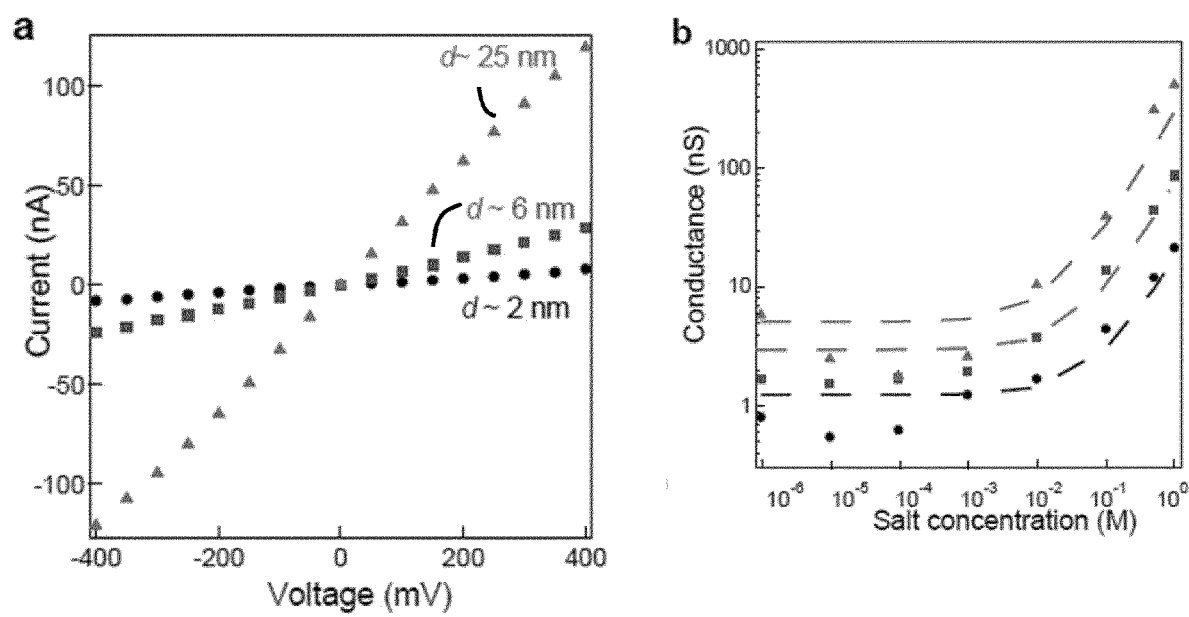
FIG. 2 represents the electrical conductance and chemical reactivity of a $MoS_2$ nanopore; a: Current-voltage response of MoS$_2$ nanopores with different pore sizes (dots: 2 nm, squares: 6 nm and triangles: 25 nm) in 1 M KCl at pH 5; b: Conductance as a function of salt concentration at pH 5. By fitting to the equation 1, the extracted surface charge values are −0.024 C m$^{-2}$, −0.053 C m$^{-2}$, −0.088 C m$^{-2}$ for a 2 nm, 6 nm, and 25 nm pore, respectively; c: Conductance as a function of pH for 10 mM KCl for a 2 nm, 6 nm, and 25 nm pore, respectively (same symbols as in a).
Figure 2:
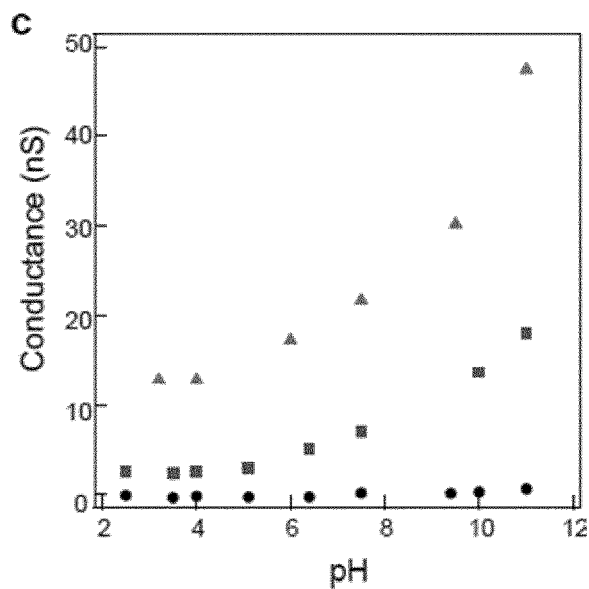

The ionic transport properties of $MoS_2$ nanopores was investigated under various ionic concentration and pH conditions, which can provide information on the surface charge of the $MoS_2$ nanopore. FIG. 2a shows I-V characteristics of $MoS_2$ nanopores with various diameters.

Large pore conductance originates from the ultrathin membrane. The conductance also depends on salt concentration (FIG. 2b) and shows saturation at low salt concentrations which is a signature of the presence of surface charge on the nanopore. The predicted pore conductance (G) taking into account surface charge (E) contribution is given by (Lee et al. 2012, *Nano Lett.*, 12, 4037-4044):

$$G = \kappa_b \left[ \frac{4L}{\pi d^2} \times \frac{1}{1 + 4\frac{l_{Du}}{d}} + \frac{2}{\alpha d + \beta l_{Du}} \right]^{-1}$$

where $\kappa_b$ is the bulk conductivity; L is the pore length, d is the pore diameter; $l_{Du}$ is the Dukhin length which can be approximated by $$\frac{|\Sigma|/e}{2c_s};$$

e is the elementary charge and $c_s$ is the salt concentration; a is a geometrical prefactor that depends on the model used ($\alpha$=2); β can also be approximated to be 2 to obtain the best fitting agreement.

From the fitting results shown in FIG. 2b, a surface charge value of $-0.024$ C m$^{-2}$, $-0.053$ C m$^{-2}$, $-0.088$ C m$^{-2}$ is found for three size pores of 2 nm, 6 nm and 25 nm at pH 5, respectively. This result is comparable to the recently reported charge of graphene nanopores ($-0.039$ C m$^{-2}$) (Shan et al., 2013, *Nanotechnology* 24, 495102) and nanotubes ($-0.025$ C m$^{-2}$ to $-0.125$ C m$^{-2}$) (Siria et al., 2013, supra) at pH 5. The surface charge density can be further modulated by adjusting pH to change the pore surface chemistry (FIG. 2c). The conductance increases with the increase of pH, suggesting the accumulation of more negative surface charges in $MoS_2$ nanopore. The simulated conductance from equation (1) at 10 mM is linearly proportional to the surface charge values, thus pH changes could significantly improve the surface charge up to the range of 0.3 to 0.8 C m$^{-2}$. The chemical reactivity of $MoS_2$ to pH is also supported by previously reported zeta potential measurements on $MoS_2$ (Ge et al., 2012, *Chem. Commun.* 48, 6484-6486). However, the surface charge density varies from pore to pore, which means that different pores can have disparate values of equilibrium constant due to the various combinations of Mo and S atoms (Farimani et al., 2014, *ACS Nano* 8, 7914-7922) at the edge of the pore.

Figure 1:
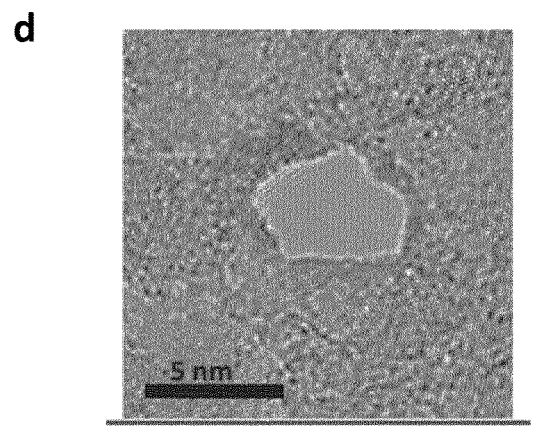
Figure 3:
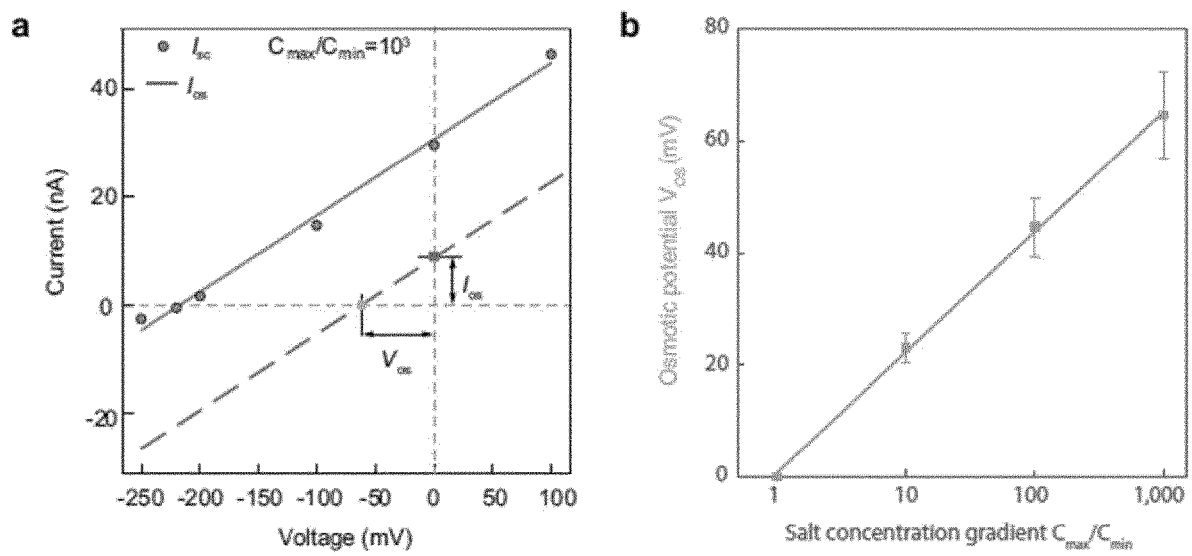
FIG. 3 represents the characteristics of the generated osmotic power; a: Current-voltage characteristics for a 15 nm nanopore in 1 M/1 mM KCl salt gradient condition. Contribution from the redox reaction on the electrodes is subtracted and leads to the dashed line which represents pure osmotic contribution. $I_{sc}$ and $V_{oc}$ are the short circuit current and open circuit voltage, whereas $I_{os}$ and $V_{os}$ are the osmotic current and potential; b: Generated osmotic potential, as a function of salt gradient. $C_{cis}$ is set to be 1 M KCl and $C_{trans}$ is tunable from 1 mM to 1 M KCl. Solid line represents linear fitting to the equation 2; c: Osmotic current vs. salt gradient. Solid line fits to the linear part; d: Osmotic potential and current as a function of pore size. Dashed lines (a guide to the eye) show the trend as the pore size is changed. Error bars come from the corresponding error estimation; e, f: pH (3, 5, 11) dependent osmotic power generation for a 3 nm pore and under different concentration gradient conditions (e: potential; f: current); g: h: pore size-dependent (3 nm and 15 nm) osmotic power generation at pH 11 under different concentration gradient conditions (g: potential; h: current).
Figure 3:
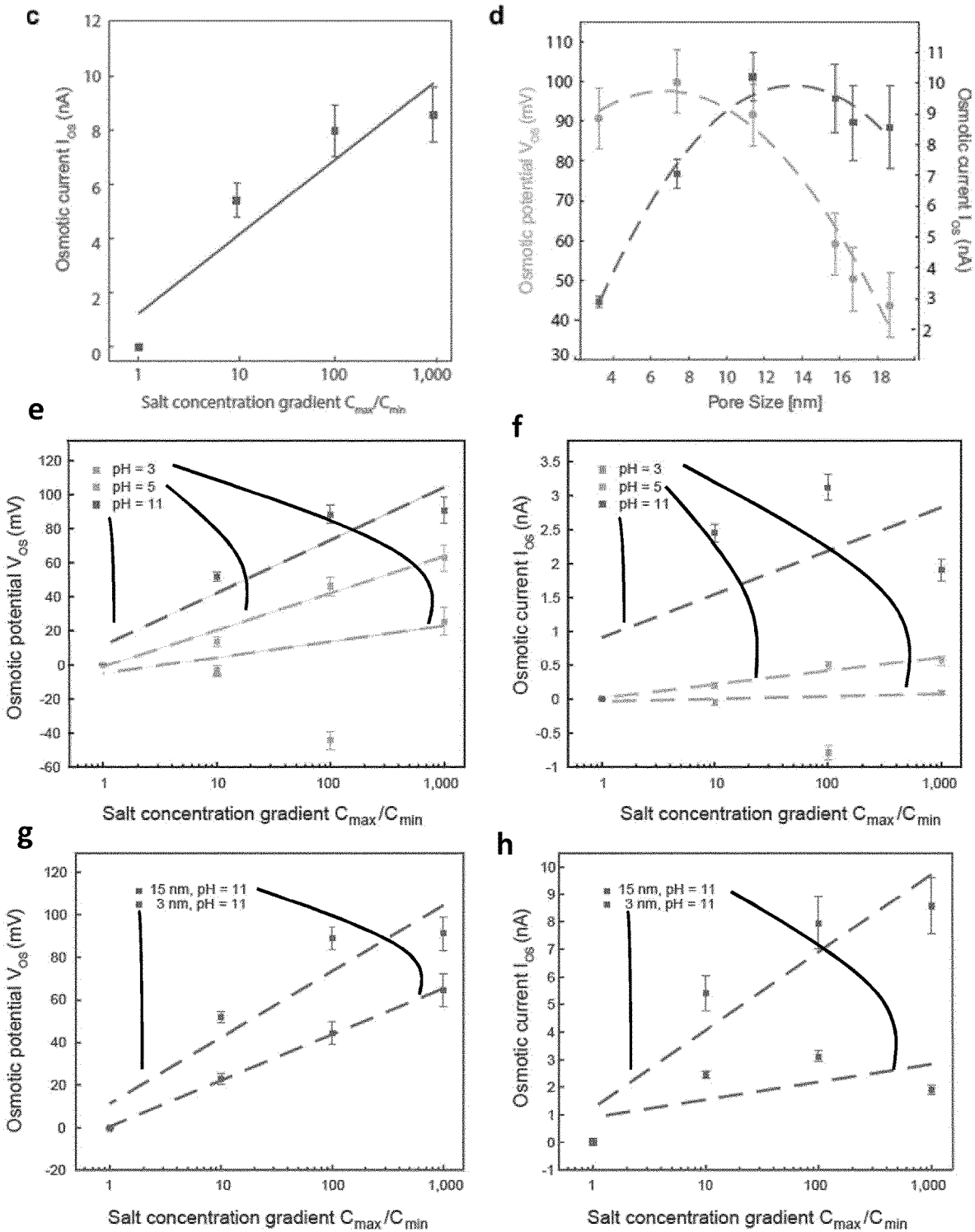
Figure 4:
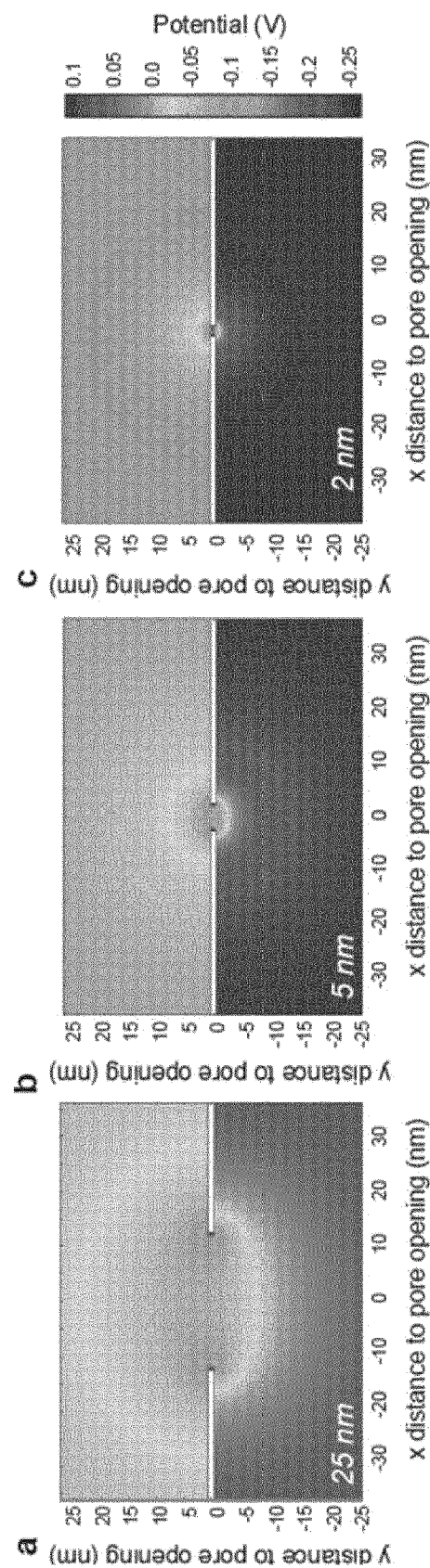
FIG. 4 represents the calculated surface potential distribution of MoS$_2$ nanopores for different pore size and the impact on ion selectivity; a: 25 nm; b: 5 nm; c: 2 nm under a fixed surface charge density. d: Ion selectivity at different salt gradient conditions. The ion selectivity also depends on the Debye length when the concentration gradient ratio is fixed and with the combination of 10 mM/1 mM in a 5 nm pore, the ion selectivity approaches nearly 1, indicating the ideal cation selectivity.
Figure 5:
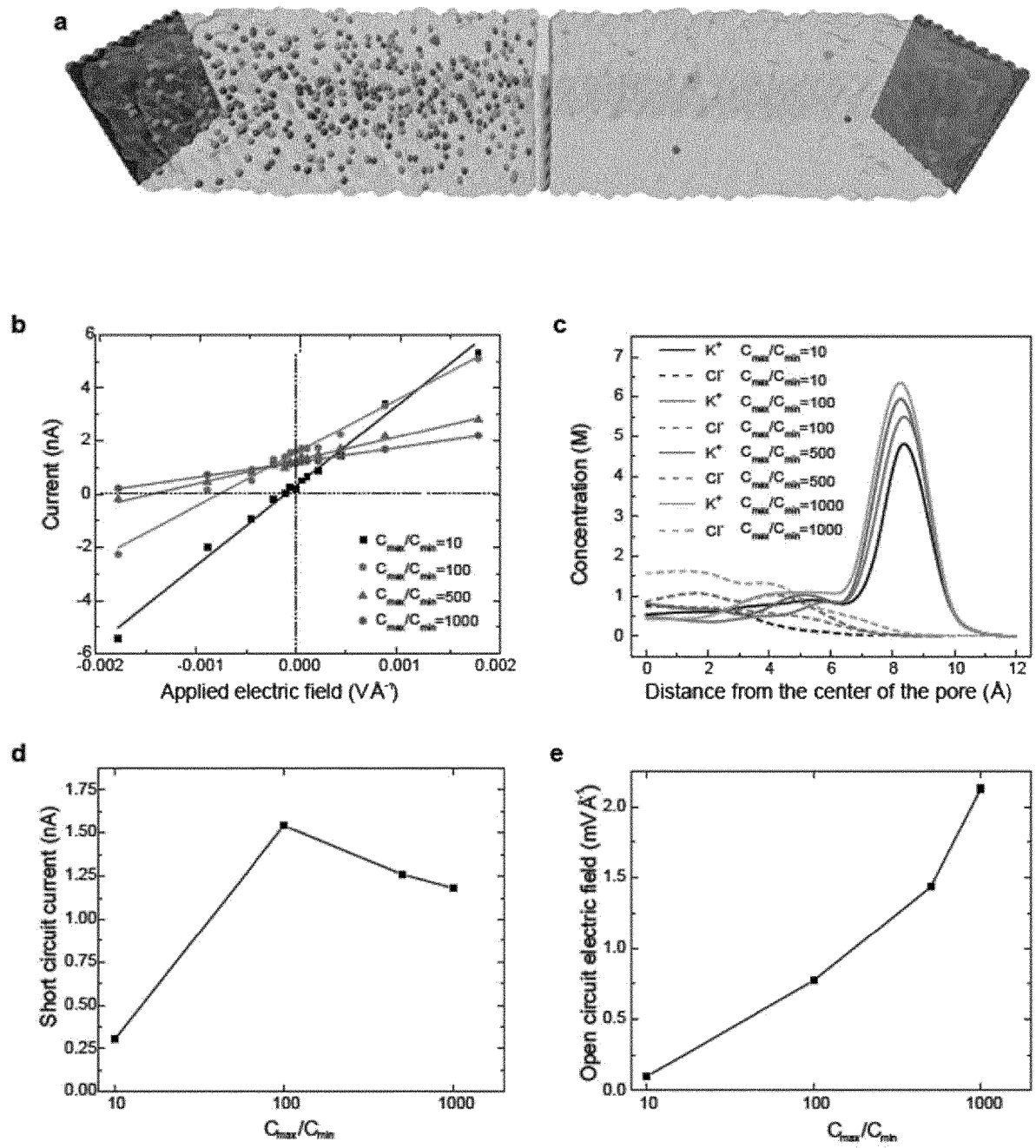
FIG. 5 represents the molecular dynamics simulated power generation at various concentration gradient ratios; a: Schematic of a typical simulation box; b: Current as a function of the applied electric field for a single-layer MoS$_2$ for different concentration ratios. c: Potassium and chloride concentrations as a function of the radial distance from the center of the pore for different concentration ratios; d: Short circuit current as a function of the concentration ratio; e: Open circuit electric field as a function of the concentration ratio.
Figure 6:
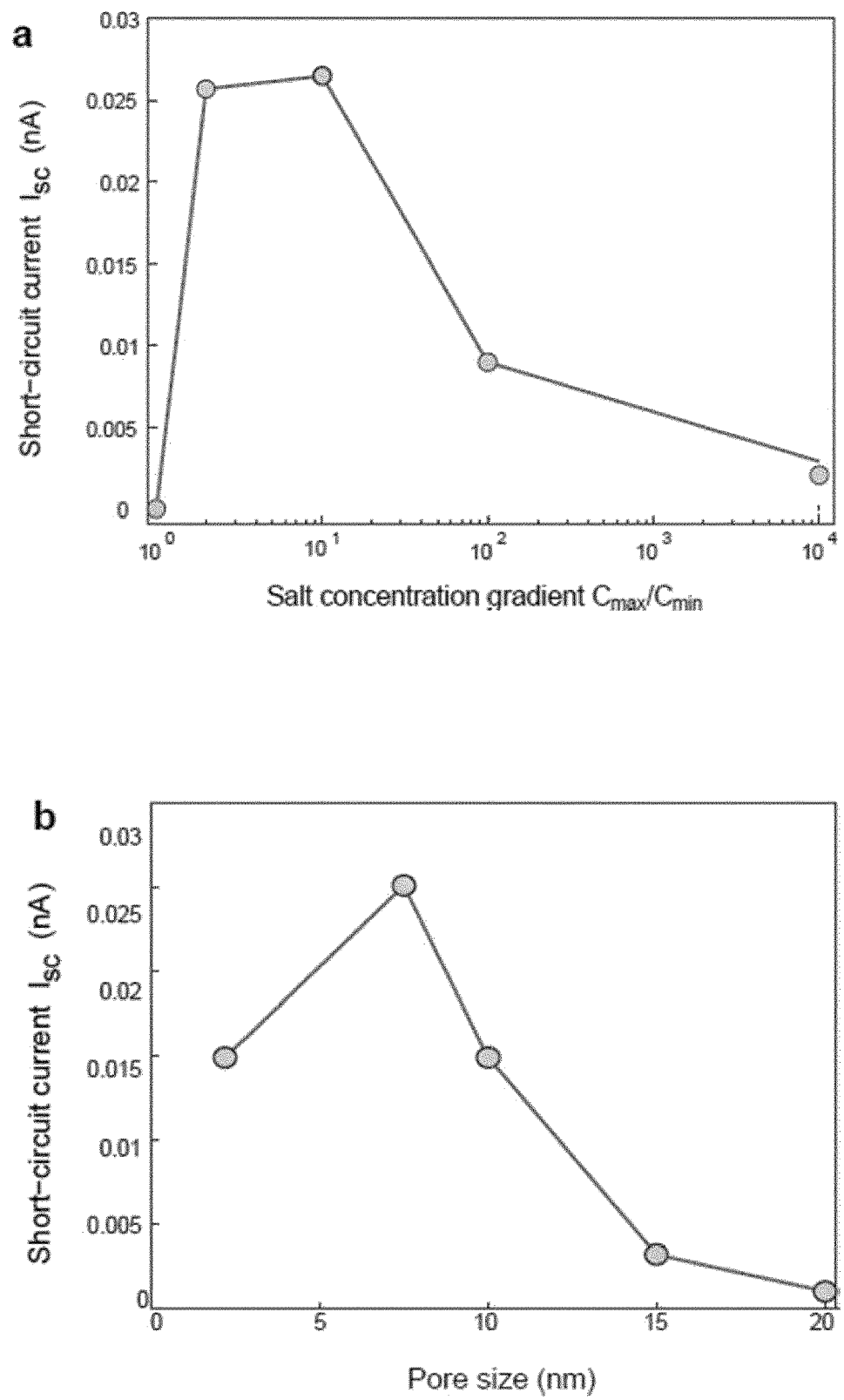
FIG. 6 represents the continuum based Poisson-Nernst-Planck (PNP) model; a: Variation of short-circuit current, $I_{sc}$ to concentration gradient ratio. The diameter of the nanopore is $d_n$=2.2 nm; b: Variation of short-circuit current as a function of the nanopore diameter. The salinity concentration ratio is fixed at 1,000. The surface charge of the nanopore is σ=−0.04694 C/m$^2$.
Figure 7:
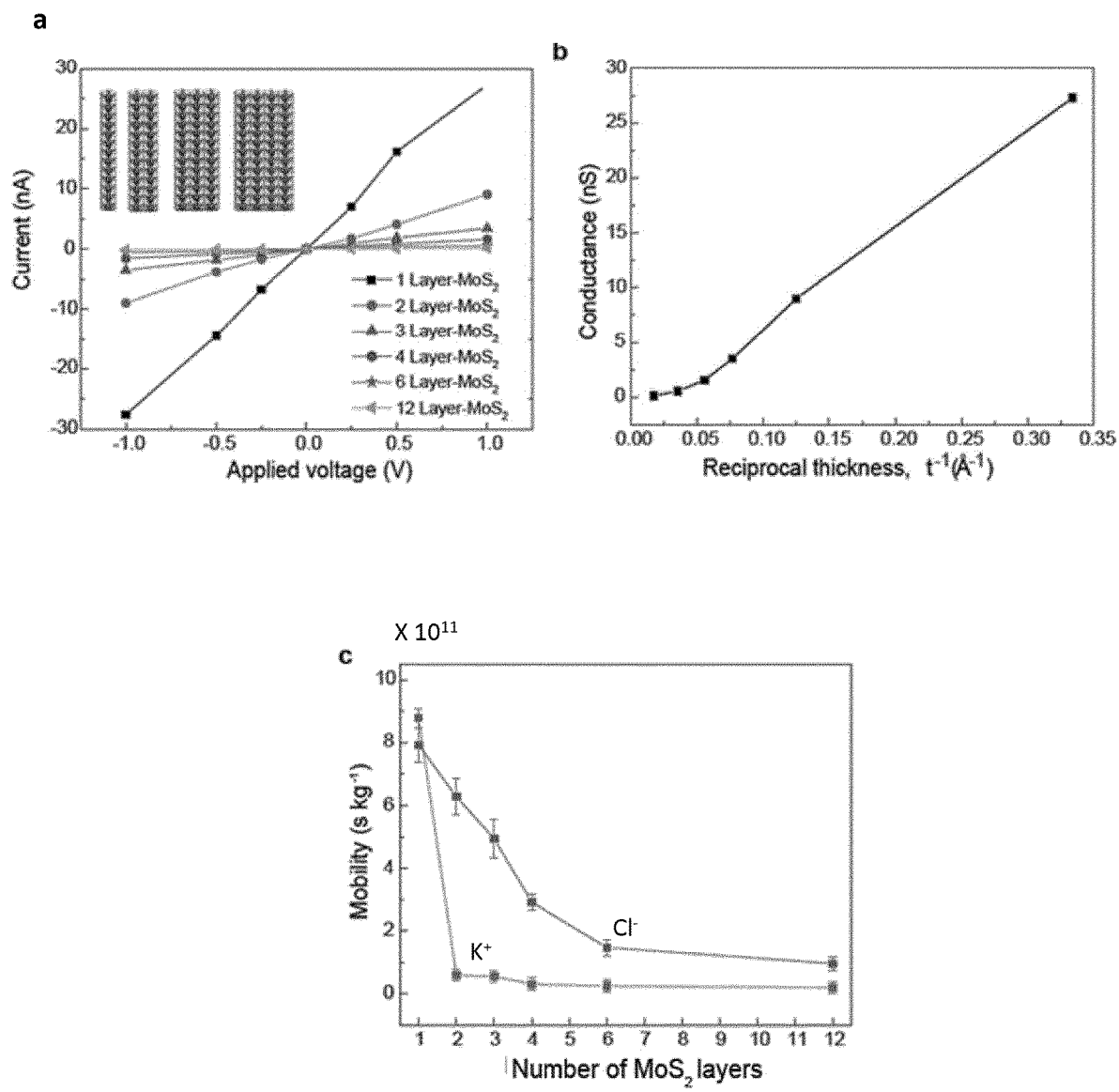
FIG. 7 represents molecular dynamics modeled conductance as a function of the layer thickness. a: Current-Voltage (I-V) curves for six membranes with a different number of MoS$_2$ layers across a symmetric 1 M KCl solution; b: Conductance of the nanopore as a function of the reciprocal thickness of the membrane (t−1). c: Average mobility of each ion for different layers of MoS$_2$ membranes.
Figure 8:
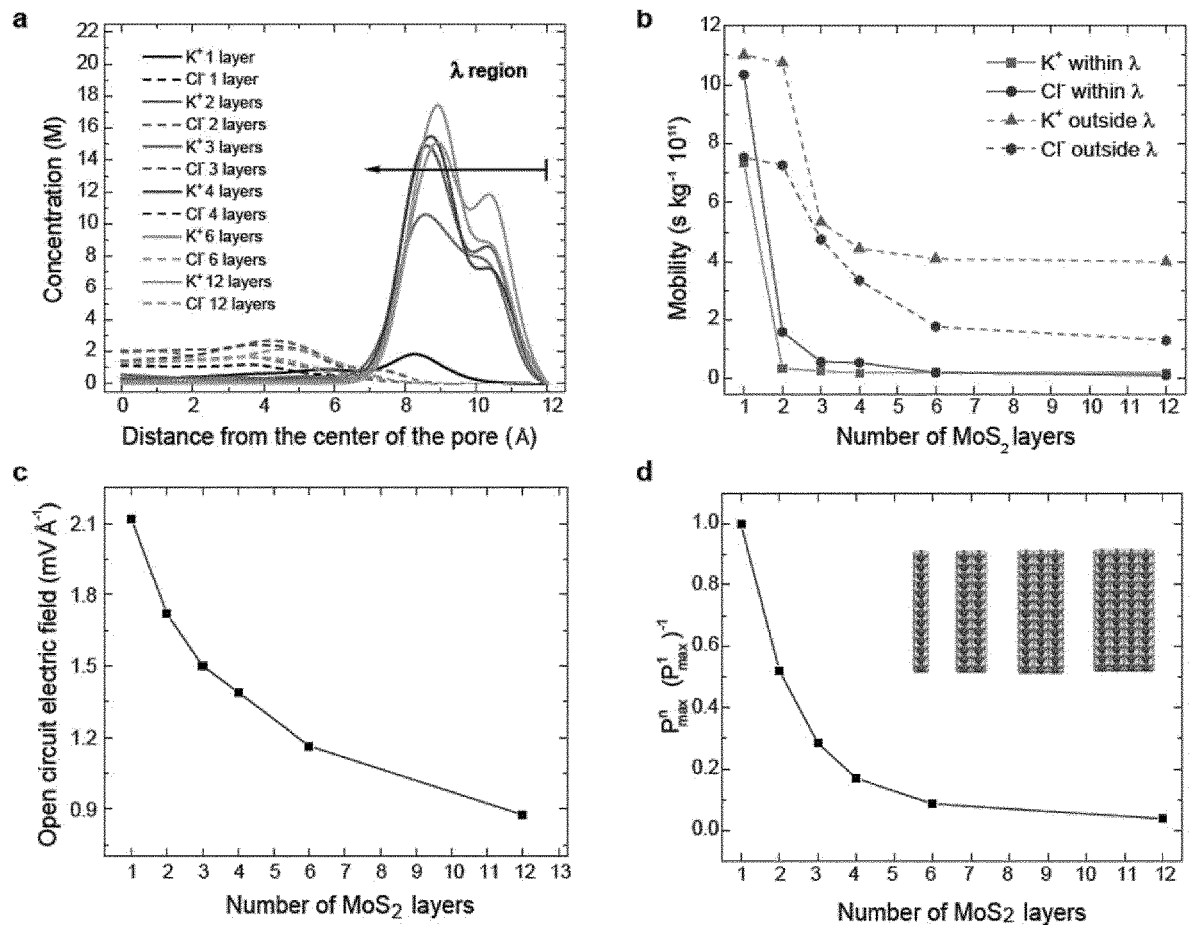
FIG. 8 represents simulated power generation vs thickness of the membrane; a: Potassium and chloride concentrations as a function of the radial distance from the center of the pore for single and multi-layer membranes. The λ region near the charged wall of the pore is representative of the ionic double layer; b: The mobility of each ion type within and outside the λ region for different layers of membranes; c: The open circuit electric field across the membrane for a different number of MoS2 layers; d: The ratio of the maximum power from multilayer membranes to the maximum power generated by a single-layer MoS$_2$.

Chemical potential gradient system was introduced by using the KCl concentration gradient system. The concentration gradient ratio is defined as $C_{cis}/C_{trans}$, where $C_{cis}$ is KCl concentration in the cis chamber and $C_{trans}$ in the trans chamber, ranging from 1 mM to 1 M. The highly negatively charged surface selectively passes the ions by their polarity (in this case potassium ions), resulting in a net positive current. By measuring the I-V response of the pore in the concentration gradient system, FIG. 3a, short-circuit ($I_{sc}$) current corresponding to zero external bias can be measured while the osmotic potential can be obtained from the open-circuit voltage ($V_{oc}$). The pure osmotic potential $V_{os}$ and current $V_{os}$ can be then obtained by subtracting the contribution from electrode-solution interface at different concentrations which follows the Nernst equation. The osmotic potential is proportional to the concentration gradient ratio (FIG. 3b) and shares a similar trend with the osmotic current (FIG. 3c). It was observed that the osmotic energy conversion is also pH dependent since the increase of pH leads to higher generated voltage and current, suggesting the importance of surface charge on the ion-selective process (FIG. 3e, f). We noticed the power generation at pH 3 is very low and may fluctuate to negative which indicates the pore charge is relatively low. A possibility for the point at negative voltage is the fluctuation to positive pore surface charges. The extracted osmotic potential is the diffusion potential and it arises from the differences in the diffusive fluxes of positive and negative ions, due to the ion-selective property of the pore where cations diffuse more rapidly than anions (FIG. 1). The diffusion potential, $V_{diff}$ can be described as (Kim et al., 2010, *Microfluid. Nanofluid.* 9, 1215-1224), $$V_{diff} = S(\Sigma)_{is} \frac{RT}{F} \ln\left[\frac{a_{KCl}^{cis}}{a_{KCl}^{trans}}\right] \qquad (2)$$

where $S(\Sigma)_{is}$ is the ion selectivity for the $MoS_2$ nanopore (equal 1 for the ideal cation selective case and 0 for the non-selective case), defined as $S(\Sigma)_{is} = t_+ - t_-$, where $t_+$ and $t_-$ are the transference numbers for positively and negatively charged ions respectively. F, R, T are the Faraday constant, the universal gas constant, and the temperature while $a_{KCl}^{cis}$, and $a_{KCl}^{trans}$ are activities of potassium ions in cis and trans solutions. By fitting the experimental data presented in FIG. 3b to equation (2), the ion selectivity coefficient S(E) is found to be 0.4, suggesting efficient cation selectivity. This is because the size of the used nanopores lies in the range where the electrical double layer overlap can occur inside the pore since the Debye length $\lambda_B$=10 nm for 1 mM KCl. At the concentration gradient of 10 mM/1 mM in a 5 nm pore, the ion selectivity approaches nearly 1, presenting the conditions for the ideal cation selectivity (Vlassiouk, et al., 2008, *Nano Lett.*, 8, 1978-1985). To further test the cation-selective behavior of the pore, it was investigated the relation between power generation and the pore size. As shown in FIG. 3d, small pores display better voltage behavior, indicating the better performance on ion selectivity. The ion selectivity $S(\Sigma)_{is}$ decreases from 0.62 to 0.23 as the pore size increases. The surface potential distribution for different pore sizes (2 nm, 5 nm, 25 nm) is calculated to compare the selectivity difference (FIGS. 4a, b and c). It has been proven that the net diffusion current only stems from the charge separation and concentration distribution within the electrical double layer and therefore, the total current can be expected to increase more rapidly within the double layer overlap range compared to larger pore sizes (FIG. 3d). The slight decrease might be attributed to reduced local concentration gradient in larger pore and also to probable overestimation of the redox potential subtraction. The current can be calculated using either a continuum based Poisson-Nernst-Planck (PNP) model or molecular dynamics simulations. The measured dependence of the osmotic potential and osmotic current as a function of the concentration ratios (FIG. 3b, c) is well captured by both computational models (molecular dynamics prediction in FIG. 5 and continuum analysis in FIG. 6a). In addition to possible depletion of local concentration gradient in large pores, the non-monotonic response to pore size (FIG. 3d, 2g, h) is also predicted by continuum-based PNP model (FIG. 6b), as a result of the decrease of ion selectivity. In order to gain further insight to the thickness scaling, the pore conductance relation proposed in equation (1) was verified using molecular dynamics (FIG. 7). Interestingly, the ion mobility is also found to scale inversely with membrane thickness (FIG. 8a, b). Molecular dynamics simulations of multilayer membranes of $MoS_2$ was carried out to investigate the power generated by those membranes and it was observed a strong decay of the generated power as the number of layers is increased (FIG. 8c, d), indicating the ultimate osmotic power generation in 2-dimensional membranes. The consistency between experiments and theoretical model highlights two important contributions playing key roles for achieving efficient power generation from a single-layer $MoS_2$ nanopore: atomic-scale pore thickness and the surface charge.

Assuming a single-layer $MoS_2$ membrane with homogeneous pore size of 10 nm and porosity of 30%, by exploiting parallelization, the estimated power density would reach $10^6$ W/m² with KCl salt gradient. These values exceed by 2 to 3 orders of magnitudes results obtained with boron nitride nanotubes (Siria et al., 203, supra) and are million times higher than reverse electrodialysis with classical exchange membranes (Logan et al., 2012, supra), as detailed in Table 1 from FIG. 9.

For a membrane hosting N pores, of size R and length L generated current will scale following the expression proposed by Siria et al. 2013, Nature, 494(7438):455-8:

$$I_{osm} \propto N \cdot \frac{2\pi R f(\Sigma)_{is}}{L} \frac{k_B T}{\eta \lambda_B} \ln\left[\frac{a_{KCl}^{cis}}{a_{KCl}^{trans}}\right] \quad (2)$$

The linear scaling in $\Sigma$ is expected to occur only for highly charged surfaces, while in the limit of low surface charge $I_{osm} \sim f(\Sigma)^3$ is expected (Siria, A. et al. 2013, supra, supplementary information), therefore resulting in considerably smaller diffusio-osmotic currents. For pore arrays, it has been shown to be subadditive and scales with $N^{0.5}$ (Gadaleta, et al, 2014, Physics of Fluids, 26), besides pore number, osmotic current depends on the interpore spacing (Gadaleta, et al, 2014, supra).

Apart from KCl salt concentration gradients, the nanopore power generator can also be applied to liquid-liquid junction systems with a chemical potential gradient, since the diffusion voltage originates from the Gibbs mixing energy of the two electrolyte liquids. This will allow exploring high-performance nanopore-based generators based on a large number of available liquid combinations (Cao et al., 2011, Energy Environ. Sci., 4, 2259-2266). For example, a large power generation based chemical potential gradient was supported by the use of two types of liquids.

Therefore, those results support that considerable energy could be generated by exploiting parallelization with multiple small pores or even a continuous porous structure with a large area of single-layer $MoS_2$ membrane, which can be scaled up for mass-production using the recently reported ECR pore fabrication technique (Feng et al., 2015, supra) or oxygen plasma-based defect creation (Surwade, et al., 2015, Nature Nanotech., 10, 459-464) for example in an arrangement as shown on scheme of FIG. 12.

Figure 11:
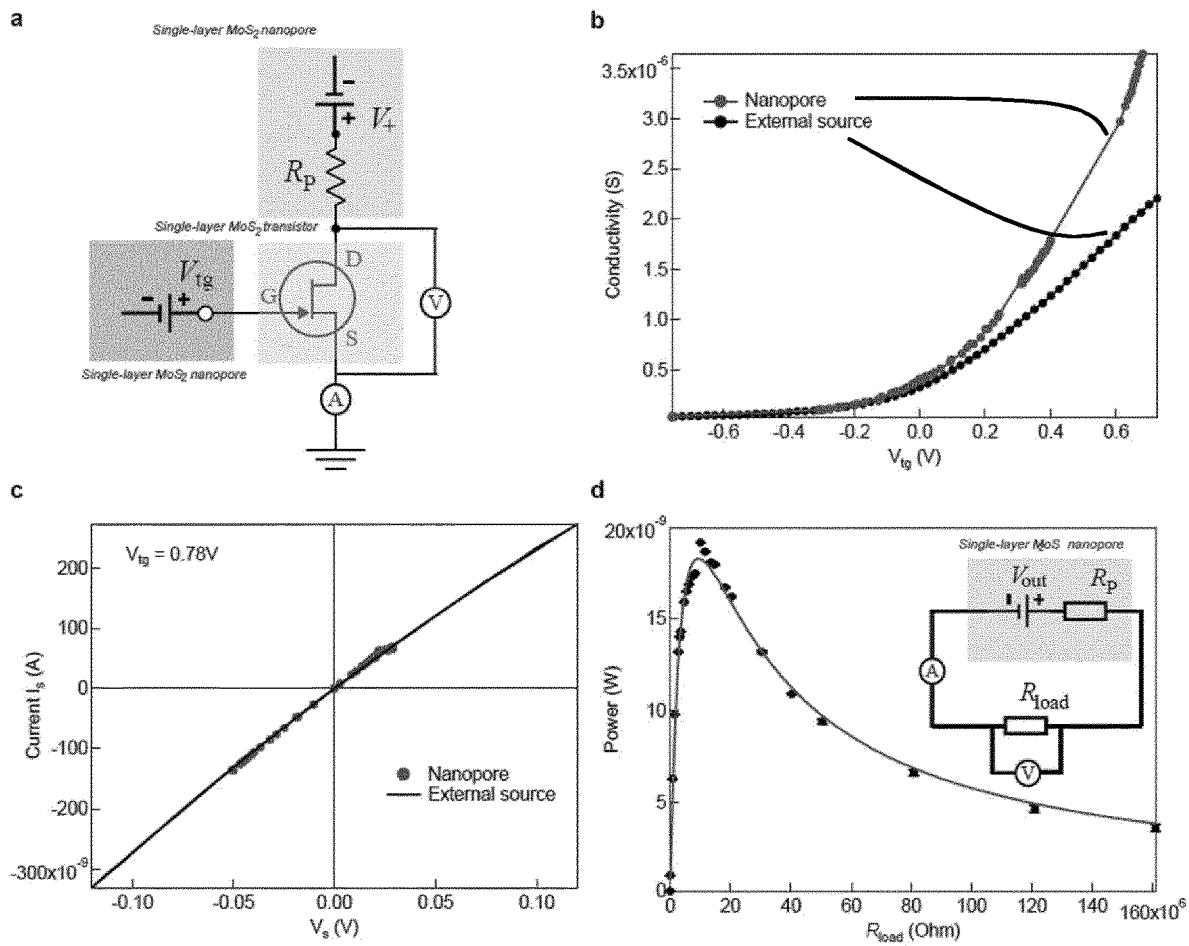
FIG. 11 represents the characterization of a single-layer MoS$_2$ transistor with nanopores and source-meter unit (SMU); a: Schematic of electrical measurements with two nanopores (V+ and Vtg). The voltage drop across the transistor channel is monitored with the voltmeter V, current is measured with current amplifier A; b: Comparison of nanopore measurements and standard two-probe measurements with an external source; c: Current-voltage characteristics at Vtg=0.78V after current stabilization, measured with both setups; d: Power of nanopore in $B_{min}$PF6/ZnCl$_2$ as described in Example 1 as a function of load resistance $R_{load}$. Inset: schematic of measurements.

For generating an osmotic power generator adapted to a nanoelectronic device, a high-performance single-layer $MoS_2$ transistor (FIG. 10a) was used in the configuration schematically shown in FIG. 10b with two nanopores to apply voltages to the drain and gate terminals of the transistor. As shown in FIG. 10c, by varying the top gate voltage in the relatively narrow window of ±0.78 V, the channel conductivity could be modulated by a factor of 50 to 80. Furthermore, when the gate voltage was fixed and the drain-source voltage $V_s$ was varied, as shown on FIG. 10c (inset), a linear $I_s$-$V_s$ curve was obtained, demonstrating efficient injection of electrons into the transistor channel. Further calibration with standard power source can be found in FIG. 11. This system is an ideal self-powered nanosystem in which all the devices are based on single-layer $MoS_2$.

Nanopore Fabrication

The $MoS_2$ nanopores used herein are fabricated as described above. Prior to nanopore fabrication, a freestanding $MoS_2$ membrane was prepared as described in Dumcenco et al., 2015, ACS Nano, 9, 4611-4620. Briefly, KOH wet etching is used to prepare $SiN_x$ membranes (10 µm×10 µm to 50 µm×50 µm, 20 nm thick). Focused ion beam (FIB) or ebeam lithography (followed by reactive ion etching) is used to drill a 50-300 nm opening on the membrane. CVD-grown single-layer $MoS_2$ membranes are suspended on the FIB drilled opening window by transferring from sapphire growth substrates. TEM irradiation can be applied to drill a single pore and image the pore. ECR is done by applying a step-like transmembrane potential to the membrane and monitoring the transmembrane ionic current with a FEMTO DLPCA-200 amplifier (FEMTO Messtechnik GmbH) with a custom-made feedback control on transmembrane conductance. Nanopores are formed when reaching the critical voltage of $MoS_2$ oxidation (>0.8 V). Then, the pore size is calibrated using current-voltage (IV) characteristics.

Osmotic Flux Measurements

The so-obtained nanopore chips are mounted in a custom-made polymethylmethacrylate (PMMA) chamber, and then wetted with $H_2O$:ethanol solution (1:1). Osmotic flux measurements are performed by taking the I-V characteristics of the nanopore in salty solutions of potassium chloride (Sigma Aldrich, various ionic concentration or pH conditions) using an Axopatch 200B patch-clamp amplifier (Molecular Devices, Inc. Sunnyvale, Calif.). A pair of chlorinated Ag/AgCl electrodes which has been rechlorinated regularly is used to apply voltage (load) on the osmotic pressure generator system and measure the resulting current. In addition, the electrode potential differences in solutions of different concentration were calibrated with a saturated Ag/AgCl reference electrode (Sigma Aldrich). To measure osmotic power generation, the reservoirs are filled with solutions of different concentrations with a range from 1 mM to 1 M. Measurements are performed at various pH conditions. Optimized generation was found for pH=11. First, the I-V response was measured and the measured short circuit current is obtained from the interception of the curve at zero voltage, while the measured open-circuit voltage is found from zero current interception. Next, to get the pure osmotically-driven contribution, the contribution from electrode-potential difference due to redox potential in different concentrations was subtracted. For all the experiments, cross-checking measurements was performed by including the changing direction of pH and concentration to make sure the nanopores are not significantly enlarged during the experiments. Most $MoS_2$ pores are generally stable during hours of experiments due to their high mechanical strength and stability within the ±600 mV bias range. For this reason, it is recommend using small supporting FIB opening windows (50 nm to 300 nm) for suspended membranes.

Characterization of Single-Layer MoS2 Transistors

For electrical measurements, Agilent 5270B SMU, SR-570 low noise current preamplifier and Keithley 2000 DMM (input impedance >$10^{10}\Omega$) was used. All measurements were performed in ambient conditions in dark. Improved efficiency of power conversion in nanopores is obtained by using a combination of pure room-temperature ionic liquids $BminPF_6$ (cis side) and zinc chloride solution (trans side) as electrically conducting liquid 4. Performance of single-layer $MoS_2$ transistor in two cases was compared:
  (i) two nanopores were used to apply $V_{tg}$ and $V_s$, while using current amplifier and voltmeter to control the current and voltage drop across the device (schematic of the setup is presented on FIG. 11;
  (ii) source-meter unit (SMU) used to perform standard two-contact measurements.

In (i), voltage dividers were used to change the source and gate voltage on the device. Although the characteristics of the transistor with both setups are similar, there were differences in the ON state conductivity which can be attributed to the slow response of the device in (i) of nanopore measurements. The change of transistor resistance by application of gate voltage leads to impedance change of the device and thus the applied effective voltage $V_{dev}$ (measured with voltmeter connected in parallel). Nanopore reacts on change of impedance with certain stabilization time (from 10 to 100 seconds). This appears to be a hysteretic effect and influences the conductivity vs. gate voltage measurements. In (ii), on the other hand $V_{dev}=V_s$ is constant. There are a number of secondary effects, which might, in turn, influence the measured values of two-probe conductivity. In relatively short channel devices, applied $V_s$ might partially contribute to gating of the channel and furthermore to modification of contact resistance. This could be understood comparing the values of $V_s$ (around 100 mV) and $V_{tg}$ (780 mV). Slight doping variations and hysteretic effects might be due to the filling of trap states inside the transistor channel. On the other hand, by driving a device to the ON state and stabilizing the current for a reasonable amount of time, one gets a very good match in drain source current-voltage $I_s$–$V_s$ characteristics, as shown on FIG. 11c. Differences in performance in both cases originate mainly from slow response time of nanopore. The resistance and the power of the nanopore with ionic liquid $BminPF_6$ were extracted. From the consideration of the simple resistor network, sketched on FIG. 11d (inset), it could be extracted the output power as a function of load resistance $R_{load}$. The dependence was fitted with the model, which assumes the constant $V_{out}$ and $R_{pore}$, $$\text{Power} = \frac{V_{out} R_{load}}{(R_P + R_{load})^2} \quad (3)$$

and a good fit was found with the $V_{out}$=0.83V, which is close to measured voltage $V_{out}$=0.78V and nanopore impedance $R_P$=(9.4±2.1) MΩ as shown in FIG. 11d.

Data Analysis

All data analysis has been performed using custom-made Matlab (R2016a) code (matrix laboratory). First, current-voltage characteristics have been recorded using an Axopatch 200B amplifier either by using an automatic or manual voltage switch. The current trace was then segmented into pieces of constant voltage. The mean µ(v) and standard deviation σ(v) of the stable part of each segment is extracted and an I-V plot generated. The error bars on the I-V plots are the standard deviation described above. All I-V characteristics were linear. In order to propagate the error correctly, a linear fitting method was used (York et al., 2004, *American Journal of Physics*, 72, 367-375). Using this method, a, b, $\sigma_a$ and $\sigma_b$ of the first order polynomial I(V)=b*V+a can be extracted. The conductance is the slope b of the I-V and a describes the offset. The height of the error-bars reported for conductance measurements is 2*$\sigma_b$.

The osmotic power generation is reported using osmotic current $I_{os}$ and osmotic voltage $V_{os}$. Starting from the linear fit values of the I-V plot, we can calculate the measured current and voltage:

$$I_{meas} = a \text{ and } V_{meas} = \frac{a}{b}.$$

These measured values have to be adjusted for the electrode potential:

$$V_{os} = V_{meas} - V_{redox} \text{ and } I_{os} = \frac{V_{os}}{V_{meas}} I_{meas}.$$

Assuming an uncertainty of the redox potential $\sigma_{redox}$ estimation of 5%, we can propagate the errors using the following formulas (Ku, 1966, *Journal of Research of the National Bureau of Standards*, 70):

$$\sigma_{V_{os}} = \sqrt{\left(\frac{1}{b}\sigma_a\right)^2 + \left(\frac{a}{b^2}\sigma_b\right)^2 + \sigma_{redox}^2} \quad (4)$$

$$\sigma_{I_{os}} = \sqrt{\sigma_a^2 + (V_{redox}\sigma_b)^2 + b^2 \sigma_{redox}^2} \quad (5)$$

The error bars reported in osmotic voltage and current plots are calculated using above relations.

Osmotic Power and Energy Conversion Efficiency

Analytical model for osmotic potential and power has been previously derived by Kim et al, 2010, supra. Briefly, in that analytical model, the osmotic potential is given by equation 1 of the main text. The current can be obtained as, $$I_{os} \propto \frac{2\pi RS(\Sigma)}{L} \frac{k_B T}{\eta \lambda_B} \ln\left[\frac{a_{KCl}^{cis}}{a_{KCl}^{trans}}\right] \quad (6)$$

The power generation from the nanopore is given as, $$P = V_{os} I_{os} \quad (7)$$

Furthermore, the power generation is maximized when the output voltage is half of the maximum voltage produced by the pore/nanochannel and is given by[1]

$$P_{max} = \frac{1}{4} \frac{V_{os}^2}{R_{pore}} \quad (8)$$

The energy conversion efficiency can be calculated using the ratio of output power/Gibbs free energy of mixing, $$\eta_{max} = \frac{f(\Sigma)^2}{2} \quad (9)$$

For typical concentrations of 1 M KCl (cis) and 1 mM KCl (trans) in single-layer $MoS_2$ nanopores, we obtain conversion efficiency of 0.2 which is much higher than conversion efficiency reported for in BNNTs (0.08) (Pattle, 1954, supra) or in nanochannels (0.03) (Loeb, 1975, supra). This difference is mainly due to the smaller pore size of single-layer $MoS_2$ nanopores.

Computational Simulations: Molecular Dynamics and Continuum Models Molecular Dynamics simulations (MD) were performed using the LAMMPS package (Plimpton, 1995, *J. Comput. Phys.*, 117, 1-19). A $MoS_2$ membrane was placed between two KCl solutions as shown in FIG. 10a. A fixed graphene wall was placed at the end of each solution reservoir. A nanopore was drilled in $MoS_2$ by removing the desired atoms. The accessible pore diameter, considered in most of the simulations, is 2.2 nm with a surface charge density of $-0.4694$ C $m^{-2}$. The system dimensions are 6 nm×6 nm×36 nm in x, y and z, respectively. The SPC/E water model was used and the SHAKE algorithm was applied to maintain the rigidity of each water molecule. The Lennard Jones (LJ) parameters are tabulated Table 2 below:

TABLE 2

| Interaction | σ [Å] | ε [kcal $mol^{-1}$] | Charge [e] |
|---|---|---|---|
| C—C[4] | 3.3900 | 0.0692 | 0.0000 |
| Mo—Mo[5] | 4.2000 | 0.0135 | 0.6000 |
| S—S[5] | 3.1300 | 0.4612 | −0.3000 |
| O—O[4] | 3.1656 | 0.1554 | −0.8476 |
| H—H[4] | 0.0000 | 0.0000 | 0.4238 |
| Mo—O | 3.9960 | 0.0581 | — |
| S—O | 3.4150 | 0.2824 | — |
| K—K[6] | 2.8400 | 0.4300 | 1.0000 |
| Cl—Cl[6] | 4.8305 | 0.0128 | −1.0000 |
| C—O[7] | 3.4360 | 0.0850 | — |
| C—H[7] | 2.6900 | 0.0383 | — |
| Rest | Obtained by Lorentz-Berthelot rule. | | |

Using MD, different ionic concentration ratios were applied across a single-layer $MoS_2$ membrane. The KCl concentration in the cis reservoir is always kept at 1 M while changing the concentration in the trans reservoir (0.1, 0.01, 0.002 and 0.001 M) to achieve different salinity ratios of 10, 100, 500 and 1,000. The current is plotted for different applied electric fields as shown in FIG. 10b.

The LJ cutoff distance was 12 Å. The long-range interactions were computed by the Particle Particle Particle Mesh (PPPM) (Hockney & Eastwood, Computer simulation using particles, CRC Press, 1988). Periodic boundary conditions were applied in the x and y directions. The system is non-periodic in the z direction. For each simulation, first the energy of the system was minimized for 10,000 steps. Next, the system was equilibrated in NPT ensemble for 2 ns at a pressure of 1 atm and a temperature of 300 K to reach the equilibrium density of water. Graphene and $MoS_2$ atoms were held fixed in space during the simulations. Then, NVT simulations were performed where the temperature was maintained at 300 K by using the Nose-Hoover thermostat with a time constant of 0.1 ps (Nosé, 1984, *The Journal of chemical physics*, 81, 511-519; Hoover, 1985, *Phys. Rev.*, 31, 1695). Trajectories of atoms were collected every picosecond to obtain the results. For accurate mobility calculations, however, the trajectories were stored every ten femtoseconds.

Continuum based 2D Poisson-Nernst-Planck model was used and in this model, the contribution of $H^+$ and $OH^-$ ions was neglected in the current calculation as its concentration is much lower compared to the bulk concentration of the ionic species. Hence, the water dissociation effects are not considered in the numerical model. Further, it was assumed that the ions are immobile inside the Steric layer and do not contribute to the ionic current. The Faradaic reactions occurring near the electrode were not modelled. Finally, it was also assumed that the convective component of current originating from the fluid flow is negligible and does not contribute to the non-monotonic osmotic current observed in the experiments. This assumption was validated by performing detailed all atom molecular dynamics simulations and predict the contribution of electroosmotic velocity in comparison to the drift velocity of the ions. Under these assumptions, the total flux of each ionic species ($\Gamma_i$) is contributed by a diffusive component resulting from the concentration gradient and an electrophoretic component arising due to the potential gradient as given by $$\Gamma_i = -D_i \nabla c_i - \Omega_i z_i F c_i \nabla \phi \quad (10)$$

where F is Faraday's constant, $z_i$ is the valence, $D_i$ is the diffusion coefficient, $\Omega_i$ is the ionic mobility, $c_i$ is the concentration of the $i^{th}$ species and $\phi$ is the electrical potential. Note that the ionic mobility is related to the diffusion coefficient by Einstein's relation[37], $$\Omega_i = \frac{D_i}{RT},$$

where R is the ideal gas constant and T is the thermodynamic temperature. The mass transport of each ionic species is, $$\frac{dc_i}{dt} = -\nabla \cdot \Gamma_i \quad (11)$$

The individual ionic current ($I_i$) across the reservoir and the pore is calculated by integrating their respective fluxes over the cross-sectional area, i.e., $$I_i = \int z_i F \Gamma_i dS \quad (12)$$

The total ionic current at any axial location is calculated as, $I = \Sigma_{i=1}^m z_i F \Gamma_i dS$, where S is the cross-sectional area corresponding to the axial location and m is the number of ionic species. In order to determine the electric potential along the system, we solve the Poisson equation, $$\nabla \cdot (\epsilon_r \nabla \phi) = -\frac{\rho_e}{\epsilon_o} \quad (13)$$

where $\epsilon_o$ is the permittivity of free space, $\epsilon_r$ is the relative permittivity of the medium and $\rho_e$ is the net space charge density of the ions defined as, $$\rho_e = F\Sigma_{i=1}^m z_i F c_i \quad (14)$$

The necessary boundary conditions were provided for the closure of the problem. The normal flux of each ion is assumed to be zero on all the walls so that there is no leakage of current. To conserve charge on the walls of the pore, the electrostatic boundary condition is given by, $$n \cdot \nabla \phi = \frac{\sigma}{\epsilon_0 \epsilon_r} \quad (15)$$

where n denotes the unit normal vector (pointing outwards) to the wall surface and σ is the surface charge density of the walls. The bulk concentration of the cis reservoir is maintained at $C_{max}$ and the bulk concentration on the trans reservoir is maintained at $C_{min}$. As the osmotic short-circuit current, $I_{sc}$ is if interest, no voltage difference was applied across the reservoirs. Thus, the boundary conditions at the ends of the cis and trans are specified as, $$c_i = C_{max}, \phi = 0 \quad (1)$$

$$c_i = C_{min}, \phi = 0 \quad (2)$$

The coupled PNP equations are numerically solved using the finite volume method in OpenFOAM[38] (OpenField Operation and Manipulation). The details regarding the solver implementation is discussed in our earlier works[39-41]. The simulated domain consists of a MoS₂ nanopore of length $L_n$=0.6 nm and diameter $d_n$ varying from 2.2 nm to 25 nm. The simulated length of the reservoir is $L_{cis}=L_{trans}$=100 nm and the diameter of the reservoir is 50 nm. Potassium chloride buffer solution is used in the simulation. The bulk concentration of the cis reservoir was fixed at 1 M and the concentration in the trans reservoir was systematically varied from 1 mM to 1 M. The simulation temperature is T=300K. The bulk diffusivities of K⁺ and Cl⁻ are 1.96×10⁻⁹ m²/s and 2.03×10⁻⁹ m²/s. The dielectric constant of the aqueous solution is assumed to be, $\epsilon_r$=80. It was also assumed zero surface charge density on the walls of the reservoir, as the reservoir is far away from the nanopore to have an influence on the transport. Unless otherwise stated, the charge on the walls of the MoS₂ nanopore is assumed to be $\sigma_n$=−0.4694 C/m², consistent with the surface charge calculated from our MD simulations.

Altogether, those data support the use of 2D material membrane in osmotic power generator for forming an osmotic flux channel, in particular MoS₂ nanopores, is promising for osmotic power generation for future renewable blue energy. The giant generated power (e.g. about 10⁶ W/m²) leads to a much higher power efficiency to any of the already described osmotic power generators.

The invention claimed is:

1. An osmotic power generator comprising:
   a housing,
   an active membrane mounted in the housing,
   at least a first chamber disposed on a first side of the active membrane for receiving a first electrolyte liquid and a second chamber disposed on a second side of the active membrane for receiving a second electrolyte liquid,
   a generator circuit comprising at least a first electrode electrically coupled to said first chamber, and at least a second electrode electrically coupled to said second chamber, the first and second electrodes configured to be connected together through a generator load receiving electrical power generated by a difference in potential and an ionic current between the first and second electrodes,
   the active membrane comprising at least one pore allowing ions to pass between the first and second sides of the active membrane under osmosis due to an osmotic gradient between the first and second electrolyte liquids to generate said difference in potential and ionic current between the first and second electrodes, wherein the active membrane comprises a thin layer of 2D material having a thickness (Hm) from 0.3 nm to 5 nm, and the at least one pore has an average diameter (Dp) from 2 nm to 25 nm.

2. The osmotic power generator according to claim 1, wherein said active membrane comprises an electrochemically etchable 2D material comprising any one or combination of transition metal dichalcogenide (TMDC) crystals, hBn silicene, transition metal trichalcogenides, metal halides, transition metal oxides, graphene, and graphene oxide.

3. The osmotic power generator according to claim 2 wherein the TMDC is selected from MoS₂, SnSe₂, WS₂, TaS₂, MoSe₂, WSe₂, TaSe₂, NbS₂, NbSe₂, TiS₂, TiSe₂, ReS₂ and ReSe₂.

4. The osmotic power generator according to claim 1, wherein the active membrane thin layer comprises MoS₂ thin layers or is a MoS₂ monolayer.

5. The osmotic power generator according to claim 1, wherein the active membrane comprises an electrochemically etchable 2D material.

6. The osmotic power generator according to claim 5, wherein the active membrane comprises any one or combination of silicene, germanene and stanene.

7. The osmotic power generator according to claim 5, wherein the electrochemically etchable 2D material is a monoelemental two-dimensional (2D) crystal or a combination of said monoelemental two-dimensional crystals.

8. The osmotic power generator according to claim 7, wherein the monoelemental two-dimensional (2D) crystal is a 2D-Xene.

9. The osmotic power generator according to claim 1, wherein said active membrane thin layer is in a single, double or multilayer form.

10. The osmotic power generator according to claim 1, wherein said active membrane comprises a plurality of pores.

11. The osmotic power generator according to claim 10, wherein a total pore surface area of said plurality of pores constitutes up to 50% of a surface area of the active membrane.

12. The osmotic power generator according to claim 1, wherein said active membrane comprises a plurality of pores, with a pore density up to 90% of a surface area of the active membrane.

13. The osmotic power generator according to claim 1, wherein the active membrane thin layer is supported by a support structure provided on at least one side of the thin layer, the support structure comprising a plurality of pillar portions spaced apart between suspended portions of the thin layer comprising a plurality of said pores.

14. The osmotic power generator according to claim 1, wherein the first and/or second electrolyte liquid is an aqueous ionic solution or a room temperature ionic liquid (RTIL).

15. The osmotic power generator according to claim 1, wherein the concentration of the electrolyte in the first electrolyte liquid varies from 4 M to 0.4 M.

16. The osmotic power generator according to claim 1, wherein the first electrolyte liquid is seawater.

17. The osmotic power generator according to claim 1, wherein the osmotic power generator comprises a pressure source or pressure generator configured to increase the pressure of the first electrolyte liquid in the first chamber.

18. The osmotic power generator according to claim 17, wherein the pressure source is gravity on a column of liquid on said first side of the active membrane.

19. The osmotic power generator according to claim 1, wherein the osmotic power generator further comprises a pressure source or pressure generator to increase the pressure of the first electrolyte liquid to 100 bars.

20. The osmotic power generator according to claim 1, wherein the osmotic power generator further comprises a temperature regulation system comprising a temperature sensing element and a heat source, to heat the first electrolyte liquid.

21. The osmotic power generator according to claim 20, wherein the heat source is a waste heat source or a renewable energy heat source.

22. The osmotic power generator according to claim 1, wherein the osmotic power generator further comprises a temperature regulation system for maintaining the temperature of the first electrolyte liquid at 4° C. to 50° C.

23. The osmotic power generator according to claim 1, wherein the generator load includes an energy storage device.

24. A method of generating osmotic power in an osmotic membrane chamber, said method comprising:
providing the osmotic power generator according to claim 1,
supplying the first electrolyte liquid on said first side of the active membrane,
supplying the second electrolyte liquid on the second side of the active membrane, whereby the first electrolyte liquid has greater ionic strength than the second electrolyte liquid, and
connecting the first and second electrodes to the generator load.

25. An osmotic power generator comprising:
a housing,
two or more active membranes separated by intermediate chambers in a stacked arrangement mounted in the housing,
at least a first chamber disposed on a first side of the stacked arrangement for receiving a first electrolyte liquid and a second chamber disposed on a second side of the stacked arrangement for receiving a second electrolyte liquid,
a generator circuit comprising at least a first electrode electrically coupled to said first chamber, and at least a second electrode electrically coupled to said second chamber, the first and second electrodes configured to be connected together through a generator load receiving electrical power generated by a difference in potential and an ionic current between the first and second electrodes,
each of the two or more active membranes comprising at least one pore allowing ions to pass between the first and second sides of the stacked arrangement under osmosis due to an osmotic gradient between the first and second electrolyte liquids to generate said difference in potential and ionic current between the first and second electrodes, wherein each active membrane comprises a thin layer of 2D material having a thickness (Hm) from 0.3 nm to 5 nm, and the at least one pore has an average diameter (Dp) from 2 nm to 25 nm.

* * * * *